United States Patent
Choi et al.

(10) Patent No.: US 10,978,736 B2
(45) Date of Patent: Apr. 13, 2021

(54) COMPOSITE MEMBRANE FOR SECONDARY BATTERY, METHOD OF PREPARING THE SAME, AND SECONDARY BATTERY INCLUDING THE SAME

(71) Applicants: Samsung Electronics Co., Ltd., Suwon-si (KR); Samsung SDI Co., Ltd., Yongin-si (KR)

(72) Inventors: Hongsoo Choi, Seoul (KR); Dongjin Lee, Seoul (KR); Wonseok Chang, Seoul (KR); Dongmin Im, Seoul (KR)

(73) Assignees: SAMSUNG ELECTRONICS CO., LTD., Gyeonggi-do (KR); SAMSUNG SDI CO., LTD., Gyeonggi-Do (KR)

( * ) Notice: Subject to any disclaimer, the term of this patent is extended or adjusted under 35 U.S.C. 154(b) by 154 days.

(21) Appl. No.: 16/224,018

(22) Filed: Dec. 18, 2018

(65) Prior Publication Data

US 2019/0326631 A1     Oct. 24, 2019

(30) Foreign Application Priority Data

Apr. 20, 2018 (KR) .................. 10-2018-0046295

(51) Int. Cl.
*H01M 10/0565* (2010.01)
*H01M 10/0568* (2010.01)
(Continued)

(52) U.S. Cl.
CPC ....... *H01M 10/0565* (2013.01); *H01M 4/382* (2013.01); *H01M 10/052* (2013.01);
(Continued)

(58) Field of Classification Search
CPC ........... H01M 10/052; H01M 10/0565; H01M 10/0568; H01M 10/058;
(Continued)

(56) References Cited

U.S. PATENT DOCUMENTS 9,203,109 B2 12/2015 Hu et al.
9,270,439 B2 2/2016 Nam et al.
(Continued)

FOREIGN PATENT DOCUMENTS

JP           5238680 B2    4/2013
KR  1020100039783 A       4/2010
(Continued)

OTHER PUBLICATIONS

Alexander S. Shaplov, et al., "Ionic IPNs as Novel Candidates for Highly Conductive Solid Polymer Electrolytes", Journal of Polymer Science: Part A: Polymer Chemistry, vol. 47, pp. 4245-4266 (2009).
(Continued)

*Primary Examiner* — Lingwen R Zeng
(74) *Attorney, Agent, or Firm* — Cantor Colburn LLP

(57) ABSTRACT

A composite membrane for a secondary battery, including: a nanostructure including a cross-linked polymer including a repeating unit represented by Formula 1 and a unit derived from a crosslinking compound:

Formula 1

(Continued)

wherein, in Formula 1, $Ar_1$, $R_1$ to $R_3$, A,

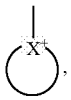

and $Y^-$ are the same as described in the specification.

31 Claims, 7 Drawing Sheets

(51) Int. Cl.
  *H01M 4/38* (2006.01)
  *H01M 10/052* (2010.01)
  *H01M 10/058* (2010.01)
  *H01M 2/16* (2006.01)

(52) U.S. Cl.
  CPC ..... *H01M 10/058* (2013.01); *H01M 10/0568* (2013.01); *H01M 2/16* (2013.01); *H01M 2300/0082* (2013.01); *H01M 2300/0094* (2013.01); *Y02E 60/10* (2013.01)

(58) Field of Classification Search
  CPC . H01M 2300/0082; H01M 2300/0094; H01M 2/16; H01M 4/382; Y02E 60/10
  See application file for complete search history.

(56) References Cited

U.S. PATENT DOCUMENTS

| 2016/0064770 A1 | 3/2016 | Lee et al. |
| 2017/0018800 A1 | 1/2017 | Choi et al. |
| 2019/0326631 A1* | 10/2019 | Choi ........................ H01M 2/16 |

FOREIGN PATENT DOCUMENTS

| KR | 1020140038930 A | 3/2014 |
| KR | 1020160026648 A | 3/2016 |
| KR | 1020170009653 A | 1/2017 |

OTHER PUBLICATIONS

Alexandra Prowald, et al., "Electrodeposition of Lithium/Polystyrene Composite Electrodes from an Ionic Liquid: First Attempts", Z. Phys. Chem. 226 (2012) 121-128.
Irene Osada, et al., "Ionic-Liquid-Based Polymer Electrolytes for Battery Applications", Angew. Chem. Int. Ed. 2016, 55, 500-513.
Jeffrey W. Fergus, "Ceramic and polymeric solid electrolytes for lithium-ion batteries", Journal of Power Sources 195 (2010) 4554-4569.
Jianhu Yang, et al., "Synthesis of Polymeric Ionic Liquid Microsphere/Pt Nanoparticle Hybrids for Electrocatalytic Oxidation of Methanol and Catalytic Oxidation of Benzyl Alcohol", Journal of Polymer Science Part A: Polymer Chemistry 2011, 49, 4531-4538.
Jungle Bai, et al., "A novel ionic liquid polymer electrolyte for quasi-solid state lithium air batteries", RSC Adv., 2017, vol. 7, pp. 30603-30609.
Kazuo Murata, et al., "An overview of the research and development of solid polymer electrolyte batteries", Electrochimica Acta, 45 (2000) 1501-1508.
Ryuma Nakamura, et al., "Preparation of Poly(ionic liquid) Hollow Particles with Switchable Permeability", American Chemical Society, Langmuir, 2016, 32, 2331-2337.
Wenjing Qian, et al., "Frontiers in poly(ionic liquid)s: syntheses and applications", Chem. Soc. Rev., 2017, 36 pp.
Zhengyuan Tu, et al., "Nanostructured Electrolytes for Stable Lithium Electrodeposition in Secondary Batteries", American Chemical Society, 2015, 10 pp.
David Mecerreyes, "Polymeric ionic liquids: Broadening the properties and application of polyelectrolytes", Progress in Polymer Science, 36 (2011) 1629-1648.

* cited by examiner

COMPOSITE MEMBRANE FOR SECONDARY BATTERY, METHOD OF PREPARING THE SAME, AND SECONDARY BATTERY INCLUDING THE SAME

CROSS-REFERENCE TO RELATED APPLICATION

This application claims priority to and the benefit of Korean Patent Application No. 10-2018-0046295, filed on Apr. 20, 2018, in the Korean Intellectual Property Office, and all the benefits accruing therefrom under 35 U.S.C. § 119, the content of which is incorporated herein by reference in its entirety.

BACKGROUND

1. Field

The present disclosure relates to a composite membrane for a secondary battery, a method of preparing the composite membrane, and a secondary battery including the composite membrane.

2. Description of the Related Art

In accordance with the explosive market growth of reusable energy storage devices applicable to electric vehicles and portable electronic devices, there is increasing demand for lithium batteries having high capacity characteristics and improved stability. To satisfy this demand, the potential use of a lithium metal electrode as an anode for a lithium battery has been considered in order to increase charge storage capacity for application at a high voltage.

When a lithium battery includes a lithium metal electrode and a solid electrolyte containing a lithium ion-conductive polymer, a metal oxide filler may be added to improve the ion conductivity of the solid electrolyte. However, the miscibility of the lithium ion-conductive polymer and the metal oxide filler in the solid electrolyte may be unsatisfactory. Therefore, there remains a need for improved lithium battery materials.

SUMMARY

Provided is a composite membrane for a secondary battery and a method of preparing the composite membrane.

Provided is a secondary battery including the composite membrane.

Additional aspects will be set forth in part in the description which follows and, in part, will be apparent from the description, or may be learned by practice of the presented embodiments.

According to an aspect of an embodiment, a composite membrane for a secondary battery includes a nanostructure including a cross-linked polymer including a repeating unit represented by Formula 1 and a unit derived from a cross-linking compound:

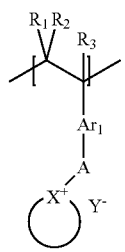

Formula 1 wherein, in Formula 1, $Ar_1$ is a substituted or unsubstituted C6-C30 arylene group or a substituted or unsubstituted C3-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

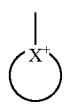

is a 3-membered to 31-membered ring including 2 to 30 carbon atoms,

X is S, N, N(R), or P(R'),

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group, and $Y^-$ is an anion.

According to an aspect of another embodiment, a secondary battery includes a cathode, an anode, and the above-described composite membrane disposed between the cathode and the anode.

According to an aspect of another embodiment, a method of preparing the above-described composite membrane for a secondary battery includes: polymerizing a monomer represented by Formula 2 and a crosslinking compound to provide a polymerization product, reacting the polymerization product with a compound represented by Formula 3 to provide a reaction product, and reacting the reaction product with a compound including an anion to thereby obtain the nanostructure including the cross-linked polymer; preparing a composite membrane formation composition including the nanostructure; and coating and drying the composite membrane formation composition, thereby preparing the composite membrane:

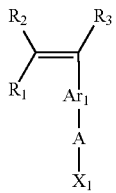

Formula 2 wherein, in Formula 2, $Ar_1$ is a substituted or unsubstituted C6-C30 arylene group, or a substituted or unsubstituted C3-C30 heteroarylene group;

$R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group;

A is a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group; and $X_1$ is a halogen atom, and

Formula 3 wherein, in Formula 3,

is a 3-membered to 31-membered ring including 2 to 30 carbon atoms,

X is S, N, N(R), or P(R'), and

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
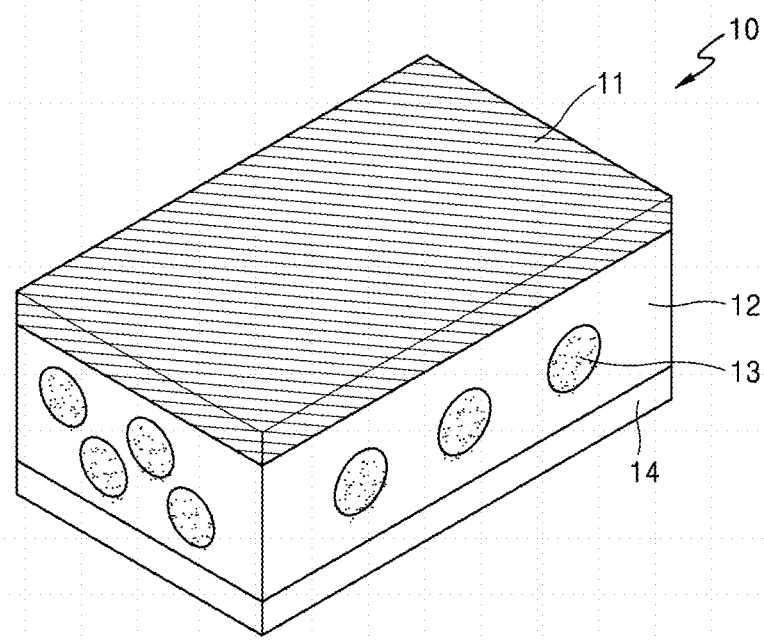
FIG. 1 is a schematic view illustrating a structure of an embodiment of a lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list.

As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of a composite membrane for a secondary battery, a method of preparing the composite membrane, and a secondary battery including the composite membrane will be described in detail.

According to an aspect of the present disclosure, a composite membrane for a secondary battery includes a nanostructure including a cross-linked polymer including a repeating unit represented by Formula 1 and a unit derived from a crosslinking (e.g., crosslinkable) compound.

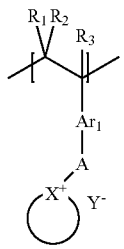

Formula 1

In Formula 1, $Ar_1$ may be a substituted or unsubstituted C6-C30 arylene group or a substituted or unsubstituted C3-C30 heteroarylene group, $R_1$, $R_2$ and $R_3$ may be each independently hydrogen, an unsubstituted or substituted C1-C20 alkyl group, an unsubstituted or substituted C6-C20 aryl group, or an unsubstituted or substituted C3-C30 heteroaryl group, A may be a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

may be a 3-membered to 31-membered ring including 2 to 30 carbon atoms,

X may be S, N, N(R), or P(R'),

R and R' may each independently hydrogen, an unsubstituted or substituted C1-C30 alkyl group, an unsubstituted or substituted C1-C30 hetero alkyl group, an unsubstituted or substituted C1-C30 alkoxy group, an unsubstituted or substituted C6-C30 aryl group, an unsubstituted or substituted C7-C30 aryl alkyl group, an unsubstituted or substituted C6-C30 aryloxy group, an unsubstituted or substituted C3-C30 heteroaryl group, an unsubstituted or substituted C4-C30 heteroaryl alkyl group, an unsubstituted or substituted C3-C30 cycloalkyl group, an unsubstituted or substituted C2-C30 alkenyl group, or an unsubstituted or substituted C3-C30 alkynyl group, and $Y^-$ may be an anion.

Lowering the crystallinity of a polymer by adding a metal oxide filler is a known method of improving ion conductivity of a solid electrolyte including a lithium ion-conductive polymer. However, there are problems with this method, such as poor miscibility, which leads to a reduction in dispersibility and lithium ion mobility. It is understood that the poor miscibility is due to poor affinity between the polymer and the metal oxide filler. Accordingly, there is a need for improvement in this regard.

To address these problems, the inventors of the present disclosure have advantageously discovered that a metal oxide filler may be replaced with a polymerized ionic liquid (PIL)-based polymer nanostructure having the same or similar interfacial characteristics as a lithium ion-conductive polymer. The PIL-based polymer nanostructure and the lithium ion-conductive polymer may have similar densities and good affinity, and thus exhibit excellent miscibility in preparing a composite membrane, such that the composite membrane may have improved lithium ion conductivity. Without being limited by theory, it is understood that the PIL-based polymer lowers a dissociation energy of a metal salt such as a lithium salt, and thus a composite membrane including the PIL-based polymer may have improved mobility characteristics of metal ions such as lithium ions to thereby provide an improved dissociation rate of metal ions and an improved charge delocalization effect. The composite membrane may also have improved mechanical characteristics. As a result, due to an improvement in real ion conductivity and a reduced over-potential, a secondary battery having improved electrochemical performance may be manufactured. The secondary battery may be, for example, a lithium secondary battery including a lithium metal anode. However, embodiments are not limited thereto.

In one or more embodiments, the nanostructure may comprise, consist essentially of, or consist of the cross-linked polymer. For example, the nanostructure may consist essentially of, or consist of the cross-linked polymer. Alternatively, the polymer Nanostructure, according to one or more embodiments, may be used as a material to form a surface coating layer on a polymer nanostructure that is known to be used in preparing an electrolyte. The nanostructure including the cross-linked polymer surface coating may be, for example, a polymethyl methacrylate nanosphere.

As used herein, the expression "a unit derived from a crosslinking compound," or "a unit derived from a crosslinkable compound" may refer to a unit obtained from the crosslinkable compound through a cross-linking reaction and a polymerization reaction of a crosslinking (crosslinkable) compound and a starting material, for example, a monomer forming the repeating unit of Formula 1.

In one or more embodiments, the cross-linked polymer is a reaction product of a compound represented by Formula 3 and a polymerization product, then a compound comprising an anion (Y⁻), wherein the polymerization product is a polymerization product of a monomer represented by Formula 2 and the crosslinking compound. More specifically, the cross-linked polymer may be a polymer obtained by reacting a polymerization product with a compound represented by Formula 3, the polymerization product being a product of polymerization of a monomer represented by Formula 2 and a crosslinking compound, and then reacting a resulting reaction product with a compound including an anion (Y⁻).

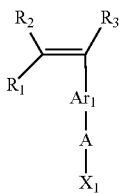

Formula 2

In Formula 2, $Ar_1$ may be a substituted or unsubstituted C6-C30 arylene group, or a substituted or unsubstituted C3-C30 heteroarylene group, $R_1$, $R_2$, and $R_3$ may each independently be hydrogen, an unsubstituted or substituted C1-C20 alkyl group, an unsubstituted or substituted C6-C20 aryl group, or an unsubstituted or substituted C3-C30 heteroaryl group, A may be a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group, and $X_1$ may be a halogen atom.

Formula 3

In Formula 3,

may be a 3-membered to 31-membered ring including 2 to 30 carbon atoms,

X may be S, N, N(R), or P(R'),

R and R' may each independently be hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group.

The nanostructure comprises the cross-linked polymer. For example, the nanostructure consists of the cross-linked polymer.

The nanostructure of the cross-linked polymer may be a nanostructure containing no other polymers, i.e., consisting essentially of the cross-linked polymer; or consisting of the cross-linked polymer; or the nanostructure of the crosslinked polymer may be a polymer nanostructure having a coating layer including the cross-linked polymer on a surface thereof; or a combination thereof may be used in the same battery.

For example, the polymer nanostructure may be a nanostructure that includes, preferably consisting essentially of, or consisting of, for example, at least one selected from any of polymethyl methacrylate, polystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylenebutylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly(methyl methacrylate-butadiene-styrene) copolymer, a poly(styrene-(C1-C9 alkyl)acrylate) copolymer, a poly(acrylonitrile-styrene-(C1-C9 alkyl) acrylate) copolymer, or a combination thereof.

In one or more embodiments, the crosslinking compound may be any compound having a functional group that may undergo a cross-linking reaction with the monomer represented by Formula 2. Non-limiting examples of the cross-linking compound may include 1,2-divinylbenzene, 1,3-divinylbenzene, 1,4-divinylbenzene 1,2,4-trivinylbenzene, 1,3-divinylnaphthalene, 1,8-divinylnaphthalene, 1,3,5-trivinylnaphthalene, 2,4-divinylbiphenyl, 4,4'-divinylbiphenyl, 3,5,7-trivinylnaphthalene, 1,2-divinyl-3,4-dimethylbenzene, 1,5,6-trivinyl-3,7-diethylnaphthalene, 1,3-divinyl-4,5-8-tributylnaphthalene, and 2,2'-divinyl-4-ethyl-4'-propylbiphenyl.

When the crosslinking compound is a compound having the structure $CH_2=CH-Ar_2-CH=CH_2$ (wherein $Ar_2$ may be a substituted or unsubstituted C6-C30 arylene group, or a substituted or unsubstituted C3-C30 heteroarylene group), the cross-linked polymer may be a polymer represented by Formula 4.

Formula 4

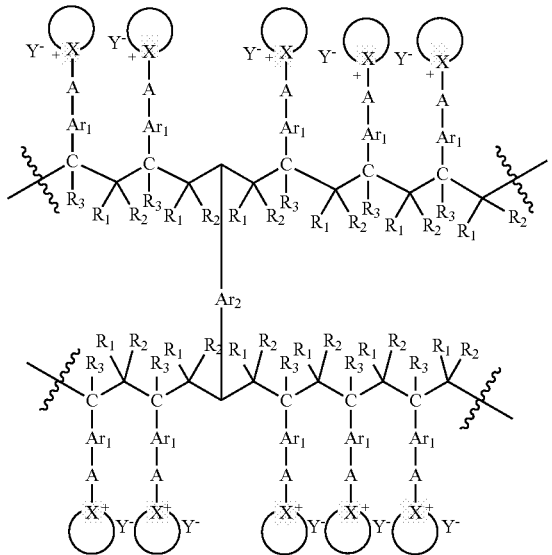

In Formula 4, $Ar_1$, A, $R_1$-$R_3$,

,

X, and Y may be the same as defined with respect to Formula 1.

The cross-linked polymer of formula (1) may be, for example, a cross-linked polymer represented by Formula 4a.

Formula 4a

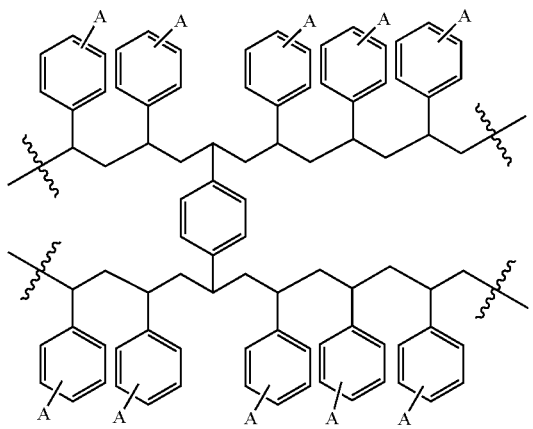

In Formula 4a, each -A is

wherein

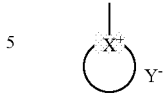

may be the same as defined with respect to Formula 1. For example, in Formula 4a, A may be represented by Formula 4-1, Formula 4-2, Formula 4-3, or Formula 4-4.

Formula 4-1

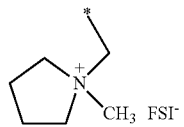

Formula 4-2

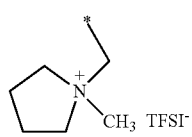

Formula 4-3

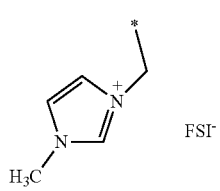

Formula 4-4

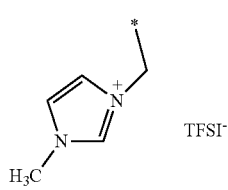

In Formulae 4b to 4-4, * indicates a binding site, TFSI denotes bis(trifluoromethanesulfonyl)imide, and FSI denotes bis(fluorosulfonyl)imide.

In one or more embodiments, the nanostructure of the cross-linked polymer may have a size of about 1 nanometer (nm) to about 10 micrometer (μm), for example, about 1 nm to about 1 μm, or about 10 nm to about 900 nm, or about 100 nm to about 900 nm, or about 300 nm to about 800 nm. In one or more embodiments, the nanostructure may have a shape of a nanosphere, a nanorod, an ellipsoidal shape, a radial shape, an irregular shape, or a combination thereof. For example, the nanostructure may have a nanospherical shape, and a content of the nanostructure may be about 0.5 parts to about 90 parts by weight, and in some embodiments, about 0.7 parts to about 50 parts by weight, and in some other embodiments, about 1 part to about 10 parts by weight, with respect to 100 parts by weight of the composite membrane. As stated above, the nanostructure of the cross-linked polymer may include the cross-linked polymer as the primary or sole constituent of the nanostructure, or the cross-linked polymer may be a coating that partially, preferably substantially, completely covers a different polymer having the above size and shape.

As used herein, the term "size" may refer to an average particle diameter when the nanostructure has a spherical shape, or a length of the major axis when the nanostructure has a non-spherical shape, for example, a rod-like shape.

In Formula 1, $Ar_1$ may be a phenylene group, a biphenylene group, a naphthalenylene group, a phenanthrenylene group, a triphenylenylene group, an anthracenylene group, a fluorenylene group, a carbazolylene group, or a combination thereof. For example, $Ar_1$ in Formula 1 may include Formula 5-1, Formula 5-2, Formula 5-3, Formula 5-4, or Formula 5-5.

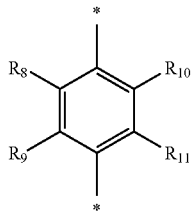

Formula 5-1

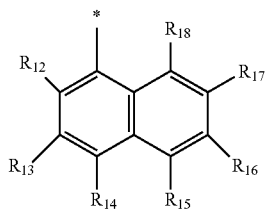

Formula 5-2

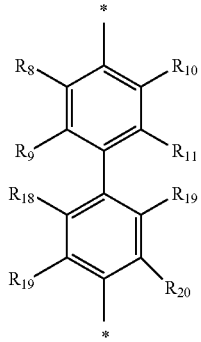

Formula 5-3

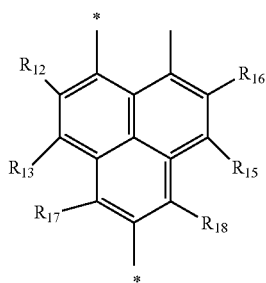

Formula 5-4

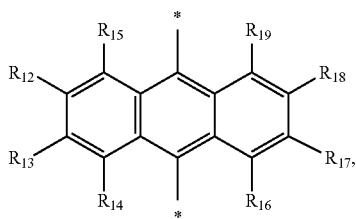

Formula 5-5

In Formula 5-1, Formula 5-2, Formula 5-3, Formula 5-4, and Formula 5-5, * indicates a binding site, and $R_8$ to $R_{20}$ may each independently be hydrogen, an unsubstituted or substituted C1-C20 alkyl group, an unsubstituted or substituted C6-C20 aryl group, or an unsubstituted or substituted C3-C30 heteroaryl group.

In Formula 1,

may be an aliphatic ring or an imidazole ring that is a nitrogen-containing aromatic ring. In the cross-linked polymer, In Formula 1,

may be a group represented by Formula 6-1, Formula 6-2, Formula 6-3, Formula 6-4, or Formula 6a.

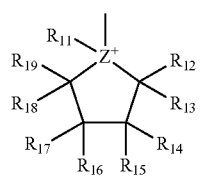

Formula 6-1

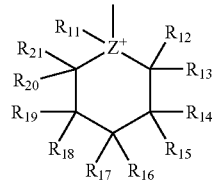

Formula 6-2

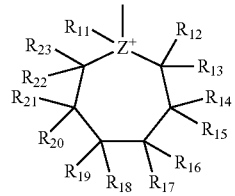

Formula 6-3

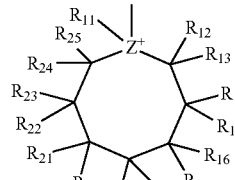

Formula 6-4

In Formula 6-1, Formula 6-2, Formula 6-3, and Formula 6-4, Z may be S, N, or P, $R_{11}$ to $R_{25}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; and $R_{11}$ may be absent when Z is S.

Formula 6a

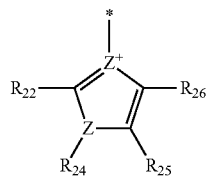

In Formula 6a, $R_{22}$ and $R_{24}$ to $R_{26}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; and each Z is N.

In Formula 1,

may be a group represented by Formula 7-1 or Formula 7-2; and $Y^-$ in Formula 1 may be include $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(OC_2F_5SO_2)_2N^-$, $(C_2F_5SO_2)(CF_3SO_2)N^-$, $NO_3$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

Formula 7-1

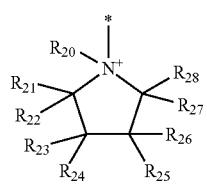

Formula 7-2

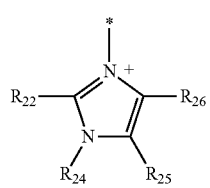

In Formula 7-1 and Formula 7-2, $R_{20}$ to $R_{28}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

In one or more embodiments, the cross-linked polymer of the nanostructure may be a cross-linked polymer including a repeating unit selected from the repeating units represented by Formula 8-1 and Formula 8-2, and a unit derived from divinylbenzene.

Formulae 8-1

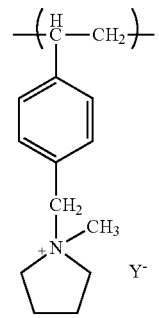

Formula 8-2

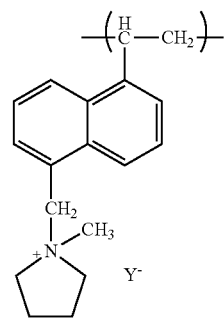

Formula 8-3

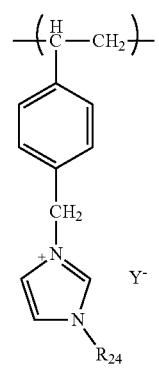

-continued

Formula 8-4

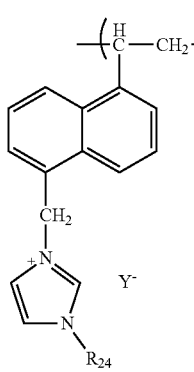

In Formula 8-1, Formula 8-2, Formula 8-3, and Formula 8-4, $R_{24}$ are each independently hydrogen, a C1-C30 alkyl group, a C1-C30 alkoxy group, C6-C30 aryl group, C6-C30 aryloxy group, a C3-C30 heteroaryl group, a C3-C30 heteroaryloxy group, a C4-C30 cycloalkyl group, or a C4-C30 heterocycloalkyl group, $Y^-$ is $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

In one or more embodiments, the composite membrane may further include an ion-conductive polymer. For example, the ion-conductive polymer may include: i) a polymer including a repeating unit represented by Formula 1a, for example a polymer consisting of the repeating unit represented by Formula 1a, ii) a first copolymer including a first repeating unit presented by Formula 1a and a second repeating unit represented by Formula 9, iii) a second copolymer including a first repeating unit represented by Formula 1a and a second repeating unit represented by Formula 9a; or iv) a combination of at least two of i), ii), or iii).

Formula 1a

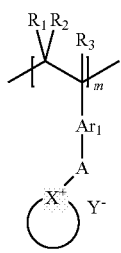

In Formula 1a, $Ar_1$ may be a substituted or unsubstituted C6-C30 arylene group, or a substituted or unsubstituted C3-C30 heteroarylene group, $R_1$, $R_2$, and $R_3$ may each independently be hydrogen, an unsubstituted or substituted C1-C20 alkyl group, an unsubstituted or substituted C6-C20 aryl group, or an unsubstituted or substituted C3-C30 heteroaryl group, A may be a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

may be a 3-membered to 31-membered ring including 2 to 30 carbon atoms,

X may be S, N, N(R), or P(R'),

R and R' may each independently be hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group, in the polymer, m may be a degree of polymerization, and may be about 10 to about 5000, or about 50 to 4,500, or about 100 to about 4,000, or about 200 to about 3,000, and $Y^-$ may be an anion, Formula 9

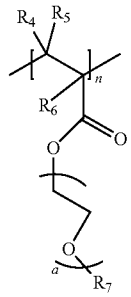

In Formula 9, $R_4$, $R_5$, and $R_6$ may each independently be hydrogen, an unsubstituted or substituted C1-C20 alkyl group, an unsubstituted or substituted C6-C20 aryl group, or an unsubstituted or substituted C3-C30 heteroaryl group;

$R_7$ may each independently be hydrogen, an unsubstituted or substituted C1-C20 alkyl group, or an unsubstituted or substituted C6-C20 aryl group;

a may be an integer from 1 to 10; and in the first copolymer, m and n, which are mole fractions of the first repeating unit represented by Formula 1 and the second repeating unit represented by Formula 9 or 9a, respectively, wherein the sum of m and n may be 1, and m and n may each independently be greater than 0 and less than 1.

Formula 9a

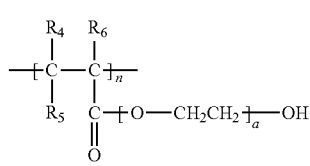

In Formula 9a, $R_4$, $R_5$, and $R_6$ may each independently be hydrogen, an unsubstituted or substituted C1-C20 alkyl group, an unsubstituted or substituted C6-C20 aryl group, or an unsubstituted or substituted C3-C30 heteroaryl group;

a may be an integer from 1 to 10; and in the second copolymer, m and n, which represent molar fractions of the repeating units represented by Formula 1 and Formula 9a, respectively, are each independently greater than 0 and less than 1, and the sum of m and n is 1.

For example, when the ion-conductive polymer includes ii) the first copolymer including a first repeating unit presented by Formula 1a and a second repeating unit represented by Formula 9, the composite membrane may have improved physical properties, for example, in terms of free-standing properties, as compared to i) when the ion-conductive polymer consists of a repeating unit represented by Formula 1a.

In Formula 1a, $Ar_1$ may be a group represented by Formula 5-1, Formula 5-2, Formula 5-3, Formula 5-4, or Formula 5-5, as described above for $Ar_1$ in Formula 1. In Formula 1a,

may be a group represented by Formula 6-1, Formula 6-2, Formula 6-3, Formula 6-4, or Formula 6a, as described above in connection with Formula 1. For example, in Formula 1a

may be a group represented by Formula 7-1 or Formula 7-2; and $Y^-$ in Formula 1a may include $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(OC_2F_5SO_2)_2N^-$, $(C_2F_5SO_2)(CF_3SO_2)N^-$, $NO_3$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The first copolymer, the second copolymer or a combination thereof may be, for example, a random copolymer.

In one or more embodiments, the composite membrane may include a metal salt including lithium (Li), sodium (Na), potassium (K), magnesium (Mg), zinc (Zn), silver (Ag), aluminum (Al), or a combination thereof. For example, the composite membrane may include a lithium salt. For example, an amount of the metal salt in the composite membrane may be about 1 part to about 90 parts by weight, or about 5 parts by weight to about 85 parts by weight, or about 10 parts by weight to about 75 parts by weight, with respect to 100 parts by weight of a total weight of the composite membrane.

When the composite membrane according to one or more embodiments includes a lithium salt, the lithium salt may form a composite of the nanostructure and the polymerized ionic liquid (PIL) thereby lowering a dissociation energy of lithium ions with a lithium ion-conductive polymer to improve lithium ion mobility and mechanical properties of the composite membrane. Accordingly, a secondary battery having improved electrochemical performance may be manufactured by using the composite membrane.

A chemical structure of the cross-linked polymer in the composite membrane according to one or more embodiments may be identified using the following methods. For example, the composite membrane including the nanostructure of the cross-linked polymer may be dissociated or dissolved in a solvent, and the solution may be subject to centrifugation to isolate the nanostructure. The isolated nanostructure may then be analyzed by using nuclear magnetic resonance (NMR) to identify a molecular structure of the cations and the degree of polymerization. A molecular structure of the anions in the nanostructure may be identified by using matrix-assisted laser desorption/ionization time-of-flight (MALDI-TOF) mass spectrometry. A shape of the nanostructure of the cross-linked polymer in the composite membrane may be identified by using scanning electron microscopy (SEM).

In the repeating units of Formulae 1 and 1a, $Ar_1$ may be an arylene or heteroarylene group as described above. The polymer or copolymer including the repeating unit of Formula 1 or Formula 1a including an arylene group or a heteroarylene group, may have improved mechanical properties due to pi-pi ($\pi$-$\pi$) interactions of the arylene group or the heteroarylene group. In Formulae 1 and 1a, when $Ar_1$ is an alkylene group or an aliphatic group such as a divalent aliphatic ring, the copolymer may have significantly reduced mechanical properties compared to when $Ar_1$ is an arylene group or a heteroarylene group.

The composite membrane according to one or more embodiments may be included in a lithium battery as a lithium anode protection layer, an electrolyte, or a lithium anode protection layer and electrolyte.

In some embodiments, the composite membrane for a secondary battery may include a copolymer including a first repeating unit, and a lithium-ion conductive second repeating unit, and the first repeating unit has good lithium ion mobility and electrochemically stable polymerized ionic liquid (PIL). The second repeating unit may be a poly(ethylene glycol) methylether methacrylate or polyoxyethylene methacrylate (POEM)) repeating unit. The composite membrane including the copolymer may improve electrochemical characteristics of the lithium secondary battery by improving low lithium ion mobility and physical properties of the second repeating unit. The first repeating unit of the copolymer may include a group that may provide structural strength and inhibit lithium dendrite growth, and the second repeating unit of the copolymer may include a POEM group as a lithium ion conductive group. The copolymer of the composite membrane, according to one or more embodiments, may be a heterogeneous polymer including the first repeating unit (PIL) and the ion conductive second repeating unit (POEM). Due to the heterogeneous state of the copolymer, a lithium dendrite growth inhibitory effect may be further improved, as compared to when a homogeneous polymer is used.

As used herein, the term "heterogeneous polymer" refers to a copolymer in which the first repeating units (PIL) and the lithium ion conductive second repeating units (POEMs) are irregularly or inhomogeneously present. The copolymer may be a random copolymer or a block copolymer.

The random copolymer may include first repeating units (PILs) and second repeating units (POEMs) in a heterogeneous state. Since the random copolymer includes the first repeating units and the second repeating units present in a heterogeneous state, the random copolymer has reduced interactions between the first repeating units as compared to a block copolymer. As a result, migration of the first repeating units to a lithium domain of the lithium anode surface is facilitated by the random copolymer, so as to enable effective blocking around lithium dendrites. Consequently, the entire copolymer may have a uniform charge delocalization effect, and thus dendrite formation caused by a local increase in lithium ions on the lithium metal surface may be effectively inhibited.

The random copolymer may be more easily synthesized, and at a lower cost, compared to block copolymers. The random copolymer may also exhibit overall similar physical properties of the polymer backbone, compared to those of a block copolymer.

For example, compared to the random copolymer, it may be difficult for a block copolymer including the first and second repeating units as described above to uniformly inhibit lithium dendrite growth on the lithium anode surface. Without being limited by theory, it is believed that the inability of the block copolymer to effectively inhibit lithium dendrite growth is due to the localized presence of the first repeating units and the second repeating units that do not include an ionic liquid moiety. In addition, for the block copolymer, charge localization may easily occur in a polymer block domain consisting of the ionic liquid moiety-free second repeating units, thus making it difficult to effectively inhibit dendrite growth caused by local reduction of lithium ions on the lithium metal surface. Compared to the random copolymer, in the block copolymer migration of the first repeating units to a lithium dendrite site may become relatively difficult due to interactions between the first repeating units, and thus blocking of lithium dendrites may be less likely to occur. Therefore, the random copolymer may have an increased lithium dendrite inhibitory effect as compared to the block copolymer.

In Formula 1a,

may be an aliphatic ring or an imidazole ring as a nitrogen-containing aromatic ring. For example, the copolymer may provide a wider reduction potential for Li metal. For example, the random copolymer may be electrochemically stable with respect to Li metal, even in a negative voltage range. The expression "electrochemically stable" used herein means that a current generated by oxidation or reduction of the copolymer itself corresponds to one half (e.g., 0.5 times) or less of a current generated by oxidation/reduction of lithium.

The aliphatic ring of the copolymer is not particularly limited and may be any aliphatic ring capable of acting as a moiety corresponding to a cation of an ionic liquid.

In Formula 1a,

may be a group represented by Formula 4 or Formula 4a, for example, a groups represented by Formulae 6-1 to 6-5, or Formula 6a, as defined above in Formula 1.

In the copolymer including the first repeating unit of Formula 1a and the second repeating unit of Formula 9, a molar ratio of the first repeating unit of Formula 1a to the second repeating unit of Formula 9 may be about 1:99 to about 99:1, or about 20:80 to about 80:20, or about 1:25 to about 75:1. In the copolymer according to one or more embodiments, a molar ratio of the first repeating unit represented by Formula 1 to the second repeating unit represented by Formula 2 may be, for example, about 1:1 to about 4:1, or about 1:1 to about 3:1, or about 2:1 to about 3:1. When the amount of the first repeating unit represented by Formula 1a or Formula 1 satisfies the above-described ranges, a composite membrane having improved ion conductivity may be obtained without deterioration in the mechanical strength of the copolymer and the composite membrane including the copolymer.

The copolymer according to one or more embodiments may be a copolymer represented by Formula 10.

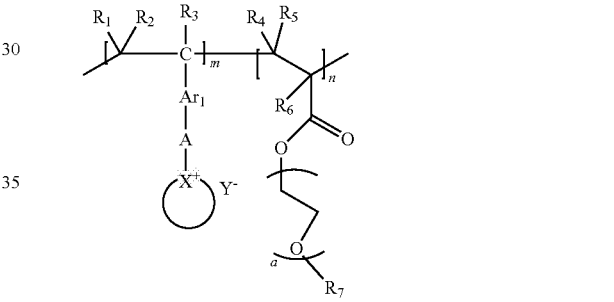

Formula 10

In Formula 10, $Ar_1$ may be a substituted or unsubstituted C6-C30 arylene group, $R_1$, $R_2$ and $R_3$ may each independently be hydrogen, an unsubstituted or substituted C1-C20 alkyl group, an unsubstituted or substituted C6-C20 aryl group, or an unsubstituted or substituted C3-C30 heteroaryl group, $R_4$, $R_5$, and $R_6$ may each independently be hydrogen, an unsubstituted or substituted C1-C20 alkyl group, an unsubstituted or substituted C6-C20 aryl group, or an unsubstituted or substituted C3-C30 heteroaryl group, A may be a bond, an unsubstituted or substituted C1-C30 alkylene group, or an unsubstituted or substituted C6-C30 arylene group, and

may be selected a represented by Formula 7-1 or Formula 7-2.

Formula 7-1

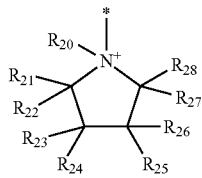

Formula 7-2

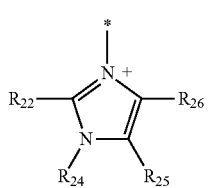

In Formula 7-1 and Formula 7-2, $R_{20}$ to $R_{28}$ may each independently be hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 hetero aryloxy group, an unsubstituted or substituted C4-C30 cycloalkyl group, or an unsubstituted or substituted C3-C30 heterocycloalkyl group; * may indicate a binding site; $Y^-$ may include $BF_4^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$, or a combination thereof; and m and n may each independently be 0.01 to 0.99, and the sum of m and n may be 1.

The copolymer according to one or more embodiments may include a compound represented by Formula 10a, Formula 10b, Formula 10c, or Formula 10d.

Formula 10a

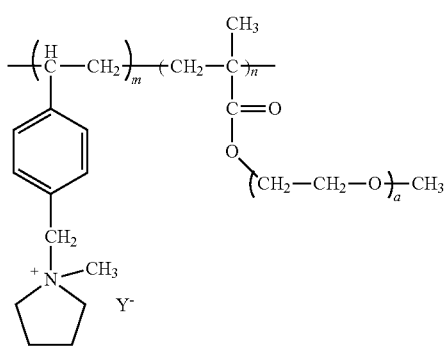

Formula 10b

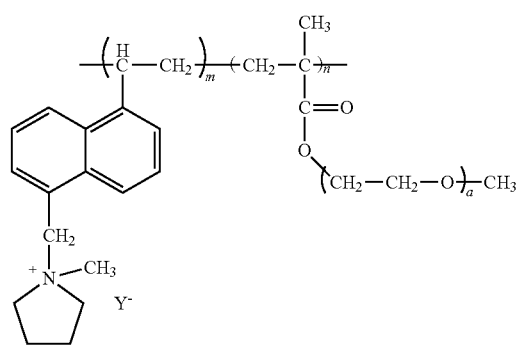

Formula 10c

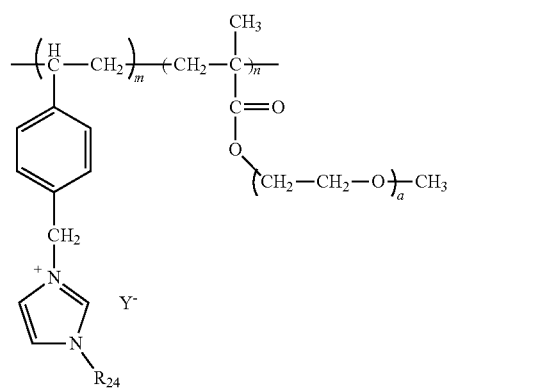

Formula 10d

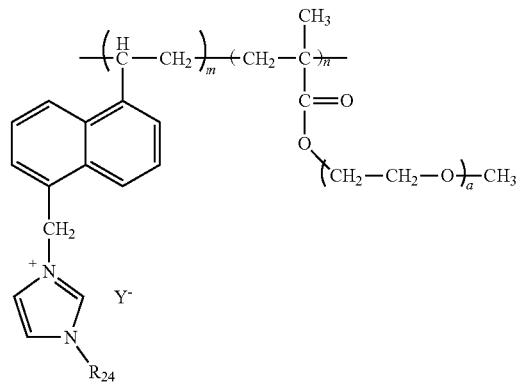

In Formulae 10a to 10d, $Y^-$ may include $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $CO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2CO_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof; a may be an integer of 1 to 10; $R_{24}$ may be H or a C1-C10 alkyl group; m and n may each independently be 0.01 to 0.99, and the sum of m and n may be 1. The copolymer may have a degree of polymerization of about 10 to about 5,000, or about 50 to 4,500, or about 100 to about 4,000, or about 200 to about 3,000.

The copolymer may have a weight average molecular weight of about 3,000 Daltons to about 300,000 Daltons, or about 4,000 Daltons to about 250,000 Daltons, or for example, about 5,000 Daltons to about 200,000 Daltons. When the copolymer has a degree of polymerization and a weight average molecular weight within the above-described ranges, the copolymer may have improved mechanical strength and may effectively inhibit the growth of lithium dendrites, and thus may further improve performance of a lithium battery. The weight average molecular weight was measured with respect to a polymethyl methacrylate (PMMA) standard sample by using gel permeation chromatography (GPC).

The copolymer may be a random copolymer.

For example, the random copolymer may have a polydispersity index (PDI) of about 1 to about 3, and in some embodiments, a PDI of about 1 to about 2.0, and in some other embodiments, a PDI of about 1.2 to about 2.8. When including the copolymer having a PDI within these ranges, a lithium battery may have further improved performance For example, the copolymer may have a glass transition temperature ($T_g$) of about 30° C. to about 90° C., or about 35° C. to about 85° C., or about 40° C. to about 80° C. For example, the copolymer may have a glass transition temperature ($T_g$) of about 55° C. at a weight average molecular weight of about 37,000 Dalton. By including the copolymer having a glass transition temperature ($T_g$) within these ranges, a lithium battery may have further improved performance.

The copolymer may be electrochemically stable at up to −0.4 Volts (V) with respect to Li. That is, a reduction current due to a side reaction of the random copolymer may be disregarded up to −0.4 V with respect to Li. For example, the random copolymer may provide an electrochemically stable, wide voltage window ranging from about −0.4 V to about 6.2 V, and in some embodiments, about −0.4 V to about 5.5 V, and in some other embodiments, about −0.4 V to about 5.0 V, and in still other embodiments, about −0.4 V to about 4.5 V, with respect to Li metal.

The composite membrane according to one or more embodiments may be included as an electrolyte in the lithium battery. By including the copolymer according to any of the embodiments, an electrolyte having improved durability and ionic conductivity may be obtained. In addition, a lithium battery including this electrolyte may have improved charge and discharge characteristics.

The electrolyte including the copolymer according to any of the embodiments may further include a lithium salt. For example, the lithium salt may include $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y may each independently be about 1 to about 30), LiF, LiBr, LiCl, LiI, $LiB(C_2O_4)_2$ (lithium bis (oxalato) borate; LiBOB), LiTFSl (lithium bis(trifluoromethanesulfonyl)imide), $LiNO_3$, or a combination thereof. However, embodiments are not limited thereto.

The electrolyte including the copolymer according to any of the above-described embodiments may further include an additional polymer. The additional polymer is not particularly limited and any polymer that may be suitable as an electrolyte may be used. For example, the electrolyte may further include polyethyleneoxide (PEO), polyvinyl alcohol (PVA), a combination thereof, or the like.

The electrolyte including the copolymer according to any of the above-described embodiments may be a liquid electrolyte or a solid electrolyte. For example, the liquid electrolyte including the copolymer according to any of the embodiments may further include an organic solvent, an ionic liquid, or a combination thereof, and thus may be in a liquid state at room temperature.

The organic solvent may include an aprotic solvent or protic solvent. For example, the aprotic solvent may be a carbonate-based solvent, an ester-based solvent, an ether-based solvent, a ketone-based solvent or a combination thereof. For example, the protic solvent may be an alcohol-based solvent. Examples of the carbonate-based solvent may include dimethyl carbonate (DMC), diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), or a combination thereof. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, or a combination thereof. Examples of the ether-based solvent may include dibutyl ether, tetraglyme, diglyme, dimethoxyethane, 2-methyl tetrahydrofuran, tetrahydrofuran, tetraethylene glycol dimethyl ether (TEGDME) or a combination thereof. An example of the ketone-based solvent may be cyclohexanone. Examples of the alcohol-based solvent may include ethyl alcohol, isopropyl alcohol, or a combination thereof, or the like. However, embodiments are not limited thereto. Any suitable aprotic solvent may be used. A combination comprising at least one of the foregoing solvents may also be used.

The ionic liquid may be any suitable ionic material in a liquid state at room temperature (25° C.) and which includes a cation and an anion. The ionic liquid may include a cation of, for example, imidazolium, ammonium, pyrrolidinium, or piperidinium, and an anion of bis(fluorosulfonyl)imide, bis (fluorosulfonyl)amide, fluoroborate, fluorophosphates, or a combination thereof. However, embodiments are not limited thereto. Examples of cations may include (C1-C10 alkyl) ammonium such as triethylammonium, imidazolium such as N-ethyl-1-methylimidazolium and N-butyl-1-methylimidazolium, or pyrrolidium or methylpropylpiperidinium such as 1-methyl-1-propylpyrrolidium. Examples of anions may include bis(trifluoromethylsulfonyl)imide (TFSI), bis(pentafluoroethylsulfonyl)imide (BETI), tetrafluoroborate ($BF_4$), hexafluorophosphate ($PF_6$), or a combination thereof.

For example, the ionic liquid may be [emim]Cl/$AlCl_3$ (wherein emim=ethyl methyl imidazolium), [bmpyr]$NTf_2$ (wherein bmpyr=butyl methyl pyridinium), [bpy]Br/$AlCl_3$ (wherein bpy=4, 4'-bipyridine), [choline]Cl/$CrCl_3.6H_2O$, [emim]OTf/[hmim]l (wherein hmim=hexyl methyl imidazolium), [choline]Cl/$HOCH_2CH_2OH$, [$Et_2MeN$ ($CH_2CH_2OMe$)]$BF_4$ (wherein Et=ethyl, Me=methyl, Pr=propyl, Bu=butyl, Ph=phenyl, Oct=octyl, and Hex=hexyl), [$Bu_3PCH_2CH_2C_8F_{17}$]OTf (wherein OTf=trifluoromethane sulfonate), [bmim]$PF_6$ (wherein bmim=butyl methyl imidazolium), [bmim]$BF_4$, [omim]$PF_6$ (wherein omim=octyl methyl imidazolium), [$Oct_3PC_{18}H_{37}$] I, [$NC(CH_2)_3mim$]$NTf_2$ (wherein mim=methyl imidazolium), [$Pr_4N$][$B(CN)_4$], [bmim]$NTf_2$, [bmim]Cl, [bmim] [$Me(OCH_2CH_2)_2OSO_3$], [$PhCH_2mim$]OTf, [$Me_3NCH(Me)$ $CH(OH)Ph$]$NTf_2$, [pmim][$(HO)_2PO_2$] (wherein pmim=propyl methyl imidazolium), [(6-Me)bquin]$NTf_2$ (wherein bquin=butyl quinolinium), [bmim][$Cu_2Cl_3$], [$C_{18}H_{37}OCH_2mim$]$BF_4$ (wherein mim=methyl imidazolium), [heim]$PF_6$ (wherein heim=hexyl ethyl imidazolium), [$mim(CH_2CH_2O)_2CH_2CH_2mim$][$NTf_2$]$_2$ (wherein mim=methyl imidazolium), [obim]$PF_6$ (wherein obim=octyl butyl imidazolium), [oquin]$NTf_2$ (wherein oquin=octyl quinolinium), [hmim][$PF_3(C_2F_5)_3$], [$C_{14}H_{29}mim$]Br (wherein mim=methyl imidazolium), [$Me_2N(C_{12}H_{25})_2$]$NO_3$, [emim] $BF_4$, [$MeN(CH_2CH_2OH)_3$][$MeOSO_3$], [$Hex_3PC_{14}H_{29}$] $NTf_2$, [emim][$EtOSO_3$], [choline][ibuprofenate], [emim] $NTf_2$, [emim][$(EtO)_2PO_2$], [emim]Cl/$CrCl_2$, or

[Hex$_3$PC$_{14}$H$_{29}$]N(CN)$_2$. However, embodiments are not limited thereto. Any materials available as ionic liquids in the art may be used.

The solid electrolyte including the copolymer according to any of the embodiments may be in a solid state at room temperature and may not include an organic solvent.

The solid electrolyte may be in a solid state at 50° C. or less, and in some embodiments, about 30° C. or less, and in some other embodiments, about 25° C. or less. By including the copolymer according to any of the embodiments, the electrolyte may be in a solid state at room temperature. The solid electrolyte may be a solvent-free electrolyte. For example, the solid electrolyte may be a solid polymer electrolyte that does not include a solvent and consists only of a copolymer and a lithium salt. Since the electrolyte does not include a solvent, problems caused by a solvent such as a side reaction and leakage of the solvent, and the like, may be prevented.

The solvent-free solid electrolyte is distinguished from a polymer gel electrolyte in which a solid polymer includes a small amount of solvent. The polymer gel electrolyte may have further improved ionic conductivity, for example, when the ion conductive polymer includes a small amount of solvent.

When the composite membrane according to any of the embodiments is used as a lithium anode protection layer, due to the inclusion of the copolymer in the protection layer, dendrite formation on a surface of the anode may be inhibited during charging and discharging of a lithium battery, and consequentially the lithium battery may have improved charge and discharge characteristics.

The anode may include lithium (Li) metal, a Li metal-based alloy, or a material that allows incorporation and deincorporation of lithium ions. However, embodiments are not limited thereto. Any material which includes Li or which allows incorporation and deincorporation of lithium ions may be used. The anode, may be, for example, Li metal. Examples of the Li metal-based alloy may include alloys of lithium with aluminum, tin, magnesium, indium, calcium, titanium, vanadium, a combination thereof, or the like.

The composite membrane may be a protective layer, and the protective layer may further include a lithium salt. By further including a lithium salt, the protective layer may have increased ionic conductivity, so that interface resistance between the anode and the electrolyte may be reduced. Examples of the lithium salt may be the same as those described above for the electrolyte including the copolymer.

The composite membrane may have a thickness of about 1 nm to about 1000 µm, and in some embodiments, about 0.1 µm to about 100 µm, and in some embodiments, about 0.5 µm to about 70 µm, and in some other embodiments, about 1 µm to 50 µm, and in some other embodiments, about 1 µm to about 20 µm. By including the composite membrane having a thickness within these ranges, a lithium battery may have an improved protection function for the lithium anode, facilitate transfer of lithium ions, and thus have improved charge and discharge characteristics.

The composite membrane may be disposed on one surface or both opposite surfaces of the anode. In some embodiments, the composite membrane may completely cover the anode, so that dendrite formation may be effective inhibited over the entire surface of the anode.

The composite membrane may have a single-layer structure or a multi-layer structure. When the composite membrane has a multi-layer structure, physical properties of the composite membrane may be easily controlled by varying the composition of each of the multiple layers. In the composite membrane having a multi-layer structure, at least one of the layers may include the copolymer according to any of the above-described embodiments.

The composite membrane may have a lithium ion conductivity of greater than about 0.001 milliSiemens per centimeter (mS/cm), or greater than about 0.005 mS/cm, or greater than about 0.01 mS/cm, for example, about 0.01 mS/cm to about 0.5 mS/cm, or about 0.05 mS/cm to about 0.5 mS/cm, or about 0.1 mS/cm to about 5 mS/cm, at about 25° C.

According to another aspect of the present disclosure, a method of preparing the composite membrane according to one or more embodiments includes the following steps.

First, polymerization of a monomer represented by Formula 2 and a crosslinking compound may be performed to provide a polymerization product.

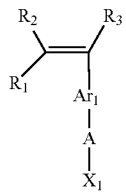

Formula 2

In Formula 2, Ar$_1$ may be a substituted or unsubstituted C6-C30 arylene group, or a substituted or unsubstituted C3-C30 heteroarylene group;

R$_1$, R$_2$, and R$_3$ may each independently be hydrogen, an unsubstituted or substituted C1-C20 alkyl group, an unsubstituted or substituted C6-C20 aryl group, or an unsubstituted or substituted C3-C30 heteroaryl group;

A may be a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group; and X$_1$ may be a halogen atom, for example, Cl, Br, or I.

In the polymerization reaction, a content of the crosslinkable compound may be about 0.01 part by weight to about 50 parts by weight, or about 0.1 part by weight to about 45 parts by weight, or about 1 part by weight to about 35 parts by weight with respect to 100 parts by weight of a combined weight of the monomer represented by Formula 2 and the crosslinkable compound.

In the polymerization reaction, a solvent, a polymerization initiator, a surfactant, or a combination thereof may be used. A molecular weight of a polymerization product and a size of the nanostructure to be included in the composite membrane may vary depending on a mixing molar ratio of the monomer represented by Formula 2 to the crosslinkable compound in the polymerization reaction, a content of the surfactant, and the like.

Non-limiting examples of the surfactant may include: nonionic surfactants, for example, ether type surfactants (such as an alkyl polyoxyethylene ether, alkyl aryl polyoxyethylene ether, or polyoxyethylene polyoxypropylene copolymer), ester-ether type surfactants (such as polyoxyethylene ether of glycerin ester, polyoxyethylene ether of sorbitan ester, or polyoxyethylene ether of sorbitol ester), ester type surfactants (such as polyethylene glycol fatty acid ester, glycerin ester, sorbitan ester, propylene glycol ester, sugar ester, or (C1-C36 alkyl)polyglycoside), and nitrogen-containing type surfactants (such as fatty acid alkanolamide, polyoxyethylene fatty acid amide, polyoxyethylene alkyl amide, or amine oxide; and polymeric surfactants, for example, polyvinyl alcohol, polyvinylpyrrolidone, polyacrylic acid, a polyacrylic-maleic acid copolymer, poly 12-hydroxystearic acid, and the like. A combination comprising at least one of the foregoing surfactants may also be used. For example, the surfactant may be polyvinylpyrrolidone.

The size of the nanostructure and a molecular weight of the cross-linked polymer may be controlled by varying the content of the surfactant. For example, the content of the surfactant may be about 0.1 part by weight to about 10 parts by weight, or about 0.2 parts by weight to about 8 parts by weight, or about 1 part by weight to about 7.5 parts by weight with respect to 100 parts by weight of a total content of the monomer represented by Formula 2 and the cross-linkable compound.

During the polymerization reaction, a polymerization and cross-linking reaction of the monomer and the crosslinking compound may occur. A thermal treatment condition for the polymerization reaction may be varied according to type of the monomer and the crosslinking compound, a mixing ratio of the monomer to the crosslinking compound, or the like. For example, the thermal treatment may be performed at about 20° C. to about 100° C., or about 25° C. to about 95° C., about 30° C. to about 100° C., or about 30° C. to about 85° C.

Next, the polymerization product may then be reacted with a compound represented by Formula 3 to provide a reaction product. Through this reaction, the $X_1$ at a terminus of the polymerization product may be converted into

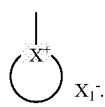

Subsequently, the reaction product may be further reacted with a compound including an anion ($Y^-$), which may be added to the reaction product, to obtain a nanostructure including the cross-linked polymer.

Formula 2

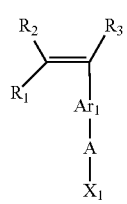

In Formula 2, $Ar_1$, $R_1$, $R_2$, and $R_3$, A, and $X_1$ are the same as described above.

Formula 3

In Formula 3,

is defined the same as described above.

The compound represented by Formula 3 may be, for example, N-methylpyrrolidine, N-methylimidazole, a combination thereof, or the like. The compound including the anion ($Y^-$) may be, for example, lithium bis(trifluoromethylsulfonyl)imide, lithium bis(fluorosulfonyl)imide, a combination thereof, or the like.

The polymerization reaction may be, for example, an emulsion polymerization or a solution polymerization. However, embodiments are not limited thereto. The polymerization temperature and the polymerization time are also not specifically limited, and may be appropriately varied.

In the nanostructure of the cross-linked polymer according to one or more embodiments, the cation/anion pair

in the first repeating unit as described above may originate from the following reaction: synthesizing a copolymer and sequentially reacting the copolymer with the compound represented by Formula 3 and then with the compound including the anion ($Y^-$) to convert X at a terminal of the copolymer into

thereby preparing the target nanostructure of the cross-linked polymer according to one or more embodiments.

Next, a composite membrane formation composition including the nanostructure of the cross-linked polymer may be prepared. An ion-conductive polymer, a metal salt including lithium (Li), sodium (Na), potassium (K), magnesium (Mg), zinc (Zn), silver (Ag), aluminum (Al), or a combination thereof, and a solvent may be added to the composite membrane formation composition. For example, the metal salt may be a lithium salt.

For example, the ion-conductive polymer may be a random copolymer as described above. A method of preparing the copolymer is disclosed in Korean Patent Application Nos. 2017-0126353 and 10-2018-0066092, the contents of which are incorporated herein by reference in their entirety.

Next, the composite membrane formation composition including the nanostructure may be coated and then dried, thereby preparing the composite membrane according to any of the above-described embodiments. For example, the coating may be performed by using a solvent casting method to coat the composite membrane formation composition on a surface. The composite membrane formation composition is then dried to form the composite membrane. However, embodiments are not limited thereto.

According to another aspect of the present disclosure, a secondary battery includes: a cathode; an anode; and the composite membrane according to any of the above-described embodiments disposed between the cathode and the anode. The secondary battery may be a lithium battery, a magnesium battery, a sodium battery, or the like. The lithium battery may be a lithium ion battery, a lithium air battery, or the like.

The lithium battery may include a lithium anode including a lithium metal, a lithium alloy, or a combination thereof. The lithium battery including the lithium anode may be a lithium metal battery.

A lithium metal battery according to an embodiment will be described with reference to FIG. 1.

Referring to FIG. 1, a lithium metal battery 10 may have a structure in which a composite membrane 12, according to any of the above-described embodiments, in a solid state is placed between a cathode 11 and a lithium metal anode 14. The composite membrane 20 may include a nanostructure 13 including a cross-linked polymer according to an embodiment.

In the secondary battery according to one or more embodiments, the anode may be a lithium metal or a lithium metal alloy electrode. In some embodiments, the anode may include an anode active material including a carbonaceous material, silicon, a silicon oxide, a silicon-based alloy, a silicon-carbonaceous material composite, tin, a tin-based alloy, a tin-carbon composite, a metal/metalloid alloyable with lithium, an alloy of the metal/metalloid alloyable with lithium, an oxide of the metal/metalloid alloyable with lithium, or a combination thereof.

The anode may be a lithium metal electrode or a lithium metal alloy electrode. The composite membrane may act as an anode protective layer, or as both an anode protective layer and an electrolyte.

The composite membrane may act as an electrolyte.

The secondary battery may further include a liquid electrolyte, a solid electrolyte, a gel electrolyte, a polymer ionic liquid, or a combination thereof.

The cathode may include a cathode active material and a copolymer including a first repeating unit represented by Formula 1a and a second repeating unit represented by Formula 9.

The lithium secondary battery may have an operating voltage of about 4.0 V or greater.

According to another aspect of the present disclosure, a protected lithium anode for a secondary battery may include: a lithium metal anode including a lithium metal or a lithium metal alloy; and the composite membrane according to any of the above-described embodiments.

The secondary battery may be a lithium secondary battery.

For example, the lithium secondary battery according to one or more embodiments may be manufactured by using the following method.

First, the lithium anode may be prepared.

Next, the cathode may be prepared as follows.

For example, a cathode active material, a conducting agent, a binder, and a solvent may be mixed together to prepare a cathode active material composition. The cathode active material composition may be directly coated on a metallic current collector and dried to prepare a cathode. In some embodiments, the cathode active material composition may be cast on a separate support to form a cathode active material film. This cathode active material film may then be separated from the support and laminated on a metallic current collector to prepare the cathode.

The cathode active material may include lithium cobalt oxide, lithium nickel cobalt manganese oxide, lithium nickel cobalt aluminum oxide, lithium iron phosphate, lithium manganese oxide, or a combination thereof. However, embodiments are not limited thereto. Any cathode active material suitable for use in a lithium battery may be used.

For example, the cathode active material may be a compound represented by one of the following formulae: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$. A combination comprising at least one of the foregoing may also be used.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include an oxide, a hydroxide, an oxyhydroxide, an oxycarbonate, a hydroxycarbonate, or a combination thereof, of the coating element. In some embodiments, the compounds for the coating layer may be amorphous or crystalline. In some embodiments, the coating element for the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. In some embodiments, the coating layer may be formed using any method that does not adversely affect the physical properties of the cathode active material when a compound of the coating element is used. For example, the coating layer may be formed using a spray coating method, or a dipping method. The coating methods may be well understood by one of ordinary skill in the art, and thus a detailed description thereof will be omitted.

For example, the cathode active material may include $LiNiO_2$, $LiCoO_2$, $LiMn_xO_{2x}$ (wherein x=1 or 2), $LiNi_{1-x}Mn_xO_2$ (wherein 0<x<1), $LiNi_{1-x-y}Co_xMn_yO_2$ (wherein 0≤x≤0.5, and 0≤y≤0.5), $LiFeO_2$, $V_2O_5$, TiS, MoS, or a combination thereof. Examples of the conducting agent for the cathode active material composition may include carbon black, graphite particles, natural graphite, artificial graphite, acetylene black, Ketjen black, carbon fibers, carbon nanotubes, or metal powders, metal fibers or metal tubes of copper, nickel, aluminum, silver, a conductive polymer such as a polyphenylene derivative, or a combination thereof. However, the conducting agent is not limited thereto the examples, and it is possible that any conducting agent suitable for a lithium battery may be used.

Examples of the binder may include vinylidene fluoride/hexafluoropropylene copolymers, polyvinylidene fluoride, polyimide, polyethylene, polyester, polyacrylonitrile, polymethylmethacrylate, polytetrafluoroethylene (PTFE), carboxymethyl cellulose/styrene-butadiene rubber (SMC/SBR) copolymers, styrene butadiene rubber based polymers, or a combination thereof.

Examples of the solvent may include N-methylpyrrolidone, acetone, water, or a combination thereof. However, the solvent is not limited thereto, and any suitable may be used.

Amounts of the cathode active material, the conducting agent, the binder, and the solvent may be determined by one skilled in the manufacture of a lithium battery without undue experimentation. One or more of the conducting agent, the binder, and the solvent may not be used according to the use and the structure of the lithium secondary battery.

Next, a separator may be disposed between the cathode (positive electrode) and the anode (negative electrode).

The separator is disposed between the positive electrode and the negative electrode. The separator is an insulating thin film having high ion permeability and mechanical strength.

The separator has a pore diameter of about 0.01 μm to about 10 μm, or about 1 μm to about 10 μm, or about 2 μm to about 10 μm and a thickness of about 5 μm to about 20 μm or about 5 μm to about 18 μm, or about 7.5 μm to about 15 μm. The separator may be sheet or non-woven fabric including an olefin-based polymer such as polypropylene, glass fibers, and/or polyethylene. When a solid polymer electrolyte is used as an electrolyte, the solid polymer electrolyte may also serve as a separator.

Examples of the olefin-based polymer as a material for forming the separator may include polyethylene, polypropylene, polyvinylidene fluoride, or a combination thereof. The separator may be a single layer film or a multi-layer film having two or more layers. The separator may be a mixed multi-layer film such as a two-layer separator of polyethylene/polypropylene, a three-layer separator of polyethylene/polypropylene/polyethylene, or a three-layer separator of polypropylene/polyethylene/polypropylene.

Next, an electrolyte may be prepared. The electrolyte may be in a liquid or gel state. The electrolyte may include the copolymer according to any of the above-described embodiments.

For example, the electrolyte may be a liquid electrolyte. The liquid electrolyte may be prepared by dissolving a lithium salt in an organic solvent. The organic solvent may be selected from the above-listed aprotic solvents. The lithium salt may be the same as that used for the above-described electrolyte.

In some embodiments, the electrolyte may be in a solid state. For example, the electrolyte may be a boron oxide, a lithium oxynitride, a combination thereof, or the like. However, embodiments are not limited thereto. Any material suitable for use as a solid electrolyte may be used. For example, a solid electrolyte may be formed on the anode by using, for example, a sputtering method.

The electrolyte may then be injected into a structure including the cathode, the protected anode, and the separator between the cathode and the protected lithium anode, thereby manufacturing the lithium secondary battery.

For example, a lithium ion battery according to an embodiment may include a cathode, an anode, and a separator. The cathode, the anode, and the separator may be wound or folded, and then accommodated in a battery case. Subsequently, an organic liquid electrolyte may be injected into the battery case, and the battery case may then be sealed with a cap assembly, thereby completing the manufacture of the lithium secondary battery. The battery case may have a cylindrical, rectangular, or thin-film shape. For example, the lithium secondary battery may be a thin film-type battery.

For example, the lithium ion battery may be a lithium ion polymer battery. In a lithium ion polymer battery, the separator may be disposed between the cathode and the anode to form a battery assembly. Subsequently, the battery assembly may be stacked or wound to form a bi-cell structure and impregnated with an organic liquid electrolyte. Next, the resultant structure may be put into a pouch and hermetically sealed, thereby completing the manufacture of the lithium ion polymer battery.

In some embodiments, a plurality of battery assemblies may be stacked to form a battery pack, which may be used in any device that benefits from high capacity and high output, for example, in a laptop computer, a smart phone, or an electric vehicle.

The lithium secondary battery may have improved thermal stability and battery characteristics, and thus may be suitable for use in an electric vehicle (EV), for example, in a hybrid vehicle such as a plug-in hybrid electric vehicle (PHEV).

In some embodiments, the lithium secondary battery may be a lithium air battery.

For example, the lithium air battery may be manufactured as follows. First, an air electrode as a cathode may be prepared. For example, the air electrode may be manufactured as follows. A conducting agent and a binder as electrode materials may be mixed together, and then an appropriate solvent may be added thereto to prepare an air electrode slurry. In some embodiments, the solvent may not be added. The air electrode slurry may be coated on a surface of a current collector and dried, optionally followed by press-molding against the current collector to improve the density of the electrode. The current collector may be a gas diffusion layer. In some embodiments, the air electrode slurry may be coated on a surface of a separator or a solid electrolyte membrane and dried, optionally followed by press-molding against the separator or solid electrolyte membrane to improve the density of the electrode.

The conducting agent included in the air electrode slurry may be a porous material. Any material that has porosity and electrical conductivity may be used without limitation. For example, a porous carbonaceous material may be used. Examples of the porous carbonaceous material may include carbon blacks, graphite, graphene, activated carbons, carbon fibers, or a combination thereof.

A catalyst for oxidation/reduction of oxygen may be added to the air electrode slurry. Examples of the catalyst may include: precious metal-based catalysts such as platinum, gold, silver, palladium, ruthenium, rhodium, and osmium; oxide-based catalysts such as manganese oxide, iron oxide, cobalt oxide, and nickel oxide; and an organic metal-based catalyst such as cobalt phthalocyanine. However, embodiments are not limited thereto. Any catalyst suitable for oxidation/reduction of oxygen may be used. A combination comprising at least one of the foregoing may also be used.

In addition, the catalyst may be supported on a catalyst support. The catalyst support may include an oxide, a zeolite, a clay-based mineral, carbon, or a combination thereof. The oxide may include alumina, silica, zirconium oxide, titanium dioxide, or a combination thereof. The oxide may include at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), tungsten (W), or a combination thereof. Examples of the carbon may include a carbon black such as Ketjen black, acetylene black, channel black, and lamp black; graphite such as natural graphite, artificial black, and expandable graphite; activated carbons; and carbon fiber. A combination comprising at least one of the foregoing may also be used. However, the carbon is not limited thereto. Any suitable catalyst support may be used.

The air electrode slurry may include a binder. The binder may include a thermoplastic resin or a thermocurable resin. For example, the binder may include polyethylene, polypropylene, polytetrafluoroethylene (PTFE), polyvinylidene fluoride (PVdF), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, or a combination thereof. However, embodiments are not limited thereto. Any suitable binders may be used.

A porous structure in a matrix or mesh form may be used as the current collector to facilitate diffusion of oxygen. A porous metal plate made of, for example, steel use stainless (SUS), nickel, or aluminum, may also be used as the current collector. Materials for the current collector are not particularly limited, and any appropriate materials for current collectors may be used. The current collector may be coated with an anti-oxidation metal or alloy film to prevent oxidation.

Optionally, the air electrode slurry may include a common catalyst for oxidation/reduction of oxygen, and a conducting agent. Optionally, the air electrode slurry may include a lithium oxide.

Next, an anode may be prepared. The anode may be a protected lithium anode.

Next, the composite membrane according to an embodiment may be located between the air electrode and the anode. According to another embodiment, a separator for a lithium secondary battery as described above may be located between the air electrode and the protected lithium anode. The separator may be a separator described above as one for the above-described lithium ion battery.

In some embodiments, instead of the separator, or in addition to the separator, the lithium air battery may further include an oxygen blocking layer that is impervious to oxygen, disposed between the air electrode and the anode. The oxygen blocking layer, which may be a lithium ion conductive solid electrolyte membrane, may function as a protective layer for preventing direct reaction between the lithium metal anode and impurities such as oxygen present in the air electrode. Examples of a material for the lithium ion conductive solid electrolyte membrane that is impervious to oxygen may include an inorganic material-containing lithium ion conductive glass, lithium ion conductive crystals (ceramic or glass-ceramic), or a combination thereof. However, embodiments are not limited thereto. Any solid electrolyte membrane having lithium ion conductivity, which impervious to oxygen and capable of protecting the anode may be used. For example, in view of chemical stability, the lithium ion conductive solid electrolyte membrane may include an oxide.

For example, the oxygen blocking layer including lithium ion conductive crystals may be a solid electrolyte membrane including $Li_{1+x+y}Al_x(Ti,Ge)_{2-x}Si_yP_{3-y}O_{12}$, wherein $0 \le x \le 2$, and $0 \le y \le 3$), for example, LATP ($Li_{1.4}Ti_{1.6}Al_{0.4}P_3O_{12}$).

Next, a liquid electrolyte may be injected between the air electrode and the protected anode. The liquid electrolyte may be the same as used in a lithium ion battery. The liquid electrolyte may be impregnated into the separator and the cathode (air electrode).

The shape of the lithium air battery is not limited to a specific shape, and for example, may have a shape like a coin, a button, a sheet, a stack, a cylinder, a plane, or a horn. The lithium air battery may be used as a battery for an electric vehicle.

The term "air" used herein is not limited to atmospheric air, and for convenience, may refer to a combination of gases including oxygen, or pure oxygen gas. This broad definition of "air" also applies to other terms, including "air battery" and "air electrode."

The copolymer according to one or more embodiments may be prepared as a random copolymer or a block copolymer according to a synthesis method. For example, the block copolymer may be prepared by using anionic polymerization and a chain transfer agent (CTA).

Substituents in the formulae above may be defined as follows.

An alkyl group refers to a completely saturated, branched or unbranched (or a straight or linear) hydrocarbon group.

Non-limiting examples of the alkyl group may include a methyl group, an ethyl group, a n-propyl group, an isopropyl group, a n-butyl group, an isobutyl group, a sec-butyl group, a t-butyl group, an isopentyl group, a neopentyl group, a n-hexyl group, a 3-methylhexyl group, a 2,2-dimethylpentyl group, a 2,3-dimethylpentyl group, and a n-heptyl group.

At least one hydrogen atom of the alkyl group may be substituted with a halogen atom, a $C_1$-$C_{20}$ alkyl group substituted with a halogen atom (for example, $CF_3$, $CH_3CF_2$, $CH_2F$, $CCl_3$, and the like), a $C_1$-$C_{20}$ alkoxy group, a $C_2$-$C_{20}$ alkoxyalkyl group, a hydroxyl group (—OH), a nitro group (—$NO_2$), a cyano group (—CN), an amino group (—$NH_2$), an alkyl amino group (RNH—, wherein R is a $C_1$-$C_{10}$ alkyl group), a dialkylamino group ($R_2$NH—, wherein each R is the same or different $C_1$-$C_{10}$ alkyl group), an amidano group (—C(═NH)$NH_2$), a hydrazine group (—$NH_2NH_2$), a hydrazone group (═N—$NH_2$), a carbamoyl group (—C(O)$NH_2$), a carboxyl group or a salt thereof (—C(═O)OX, wherein X is a hydrogen or a counterion), a sulfonyl group (—S(═O)$_2$—), a sulfamoyl group ($NH_2$—$SO_2$—), a sulfonic acid group or a salt thereof (—$SO_3X_2$, wherein X is a hydrogen or a counterion), a phosphoric acid or a salt thereof (—$PO_3X_2$, wherein X is a hydrogen or a counterion), a tosyl ($CH_3C_6H_4SO_2$—), a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_7$-$C_{20}$ arylalkyl group, a $C_5$-$C_{20}$ heteroaryl group, a $C_5$-$C_{20}$ heteroarylalkyl group, a $C_5$-$C_{20}$ heteroaryloxy group, a $C_5$-$C_{20}$ heteroaryloxyalkyl group, or a $C_5$-$C_{20}$ heteroarylalkyl group, provided that the substituted atom's normal valence is not exceeded.

An alkenyl group may refer to an aliphatic hydrocarbon group including one or more double bonds. An alkynyl group may refer to an aliphatic hydrocarbon including one or more triple bonds. At least one hydrogen atom in the alkenyl or alkynyl group may be substituted with one of the substituents as described above in connection with the alkyl group. The indicated total number of carbon atoms for a group does not include any substituents if present.

A cycloalkyl group may refer to an aliphatic hydrocarbon group including at least one ring and optionally an alkyl group. The alkyl group in the cycloalkyl group may be the same as described above. Non-limiting examples of the cycloalkyl group may include a cyclopropyl group, a cyclohexyl group, and a cyclopropylmethyl group. A heterocycloalkyl group may refer to a cycloalkyl group including nitrogen (N), oxygen (O), phosphorous (P), sulfur (S), or a combination thereof. The cycloalkyl group in the heterocycloalkyl group may be the same as described above. At least one hydrogen atom in the cycloalkyl or heterocycloalkyl group may be substituted with one of the substituents as described above in connection with the alkyl group.

A halogen atom may include fluorine, bromine, chlorine, iodine, or the like.

An alkoxy group indicates "alkyl-O—", wherein the alkyl group may be the same as described above. Non-limiting examples of the alkoxy group may include a methoxy group, an ethoxy group, a propoxy group, a 2-propoxy group, a butoxy group, a t-butoxy group, a pentyloxy group, and a hexyloxy group. At least one hydrogen atom in the alkoxy group may be substituted with one of the substituents as described above in connection with the alkyl group.

A cycloalkyloxy group indicates "cycloalkyl-O—", wherein the cycloalkyl group may be the same as described above. Non-limiting examples of the cycloalkoxy group may include a cyclopropoxy group, a cyclopropylmethyl group, and a cyclohexyloxy group. A heterocycloalkyloxy group indicates "heterocycloalkyl-O—", wherein the heterocycloalkyl group may be the same as described above. At least one hydrogen atom in the cycloalkyloxy group or the heterocycloalkyloxy group may be substituted with one of the substituents as described above in connection with the alkyl group.

The term "aryl" group, which is used alone or in combination, refers to an aromatic hydrocarbon group containing at least one (e.g., 1, 2, 3, or 4) ring(s). The term "aryl group" includes a group having an aromatic ring optionally fused to at least one cycloalkyl ring. Non-limiting examples of the aryl group may include a phenyl group, a naphthyl group, and a tetrahydronaphthyl group. At least one hydrogen atom in the aryl group may be substituted with one of the substituents as described above in connection with the alkyl group.

An arylalkyl group indicates "aryl-alkyl-" and an alkylaryl group indicates "alkyl-aryl-", wherein the alkyl group and the aryl group may be the same as described above.

An aryloxy group indicates "aryl-O—", wherein the aryl group may be the same as described above.

An arylthio group indicates "aryl group-S—", wherein the aryl group may be the same as described above.

A heteroaryl group an aryl group as described above including nitrogen (N), oxygen (O), phosphorous (P), sulfur (S), or a combination thereof in a ring thereof, wherein the rest of the cyclic atoms are all carbon. The heteroaryl group may include, for example, one to five heteroatoms, and in an embodiment, may include a five- to ten-membered ring. In the heteroaryl group, S or N may be present in various oxidized forms.

Non-limiting examples of a monocyclic heteroaryl group may include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, or a 5-pyrimidin-2-yl group.

The heteroaryl group may also include a heteroaromatic ring fused to at least one of an aryl group, a cycloaliphatic group, or a heterocyclic group.

Non-limiting examples of a bicyclic heteroaryl group may include an indolyl group, an isoindolyl group, an indazolyl group, an indolizinyl group, a purinyl group, a quinolizinyl group, a quinolinyl group, and an isoquinolinyl group. At least one hydrogen atom of the heteroaryl group may be substituted with one of the substituents as described above in connection with the alkyl group.

A heteroaryl alkyl group indicates "heteroaryl-alkyl" wherein the aryl group is the same as described above. Non-limiting examples of the heteroarylalkyl group may include a thiophen-2-ylmethylene group. A heteroaryloxy group indicates "heteroaryl-O—", wherein the heteroaryl group may be the same as described above. A hetero arylthio group indicates "heteroaryl-S—", wherein the heteroaryl group is the same as described above.

The terms "alkylene", "arylene", "heteroarylene", "cycloalkylene", and "heterocycloalkylene" may refer to an alkyl, aryl, heteroaryl, cycloalkyl, and heterocycloalkyl group, respectively, of which one hydrogen atom is removed.

It is to be understood that in some chemical formulae herein, a point of attachment may be indicated by a bond "-" with or without an asterisk (i.e., "-*").

One or more embodiments of the present disclosure will now be described in detail with reference to the following examples. However, these examples are only for illustrative purposes and are not intended to limit the scope of the one or more embodiments of the present disclosure.

Preparation Example 1: Synthesis of Nanostructure

After 3 g of 1-chloromethyl-4-vinylbenzene (available from Oakwood Chemical), 50 g of ethanol, and 0.07 g of divinylbenzene as a crosslinkable compound (0.0023 parts by weight with respect to 100 parts by weight of a total weight of the 1-chloromethyl-4-vinylbenzene and the divinylbenzene were mixed in a reactor, 0.06 g of azobisisobutyronitrile (AIBN) as a polymerization initiator and 0.1 g of polyvinylpyrrolidone (PVP) as a surfactant were added thereto. Then, this mixture was subjected to emulsion polymerization with stirring at about 75° C. for about 24 hours. The amount of the divinylbenzene was about 2.3 parts by weight with respect to 100 parts by weight of a total combined weight of the 1-chloromethyl-4-vinylbenzene and the divinylbenzene. After termination of the emulsion polymerization, the solvent was removed by evaporation under reduced pressure, and the resultant was precipitated with n-hexane to obtain a product A1. To the product A1 from the precipitation, 6.13 g of N-methylpyrrolidine (97%, available from Sigma-Aldrich) dissolved in 100 mL of dichloroethane was added. Then, the mixture was reacted at about 25° C. for about 24 hours to prepare a polymer A2. These processes and structures of the product A1 and the polymer A2 are represented in Reaction Scheme 1, wherein a unit derived from divinylbenzene as the crosslinkable compound in each polymer is omitted for convenience of illustration.

Reaction Scheme 1

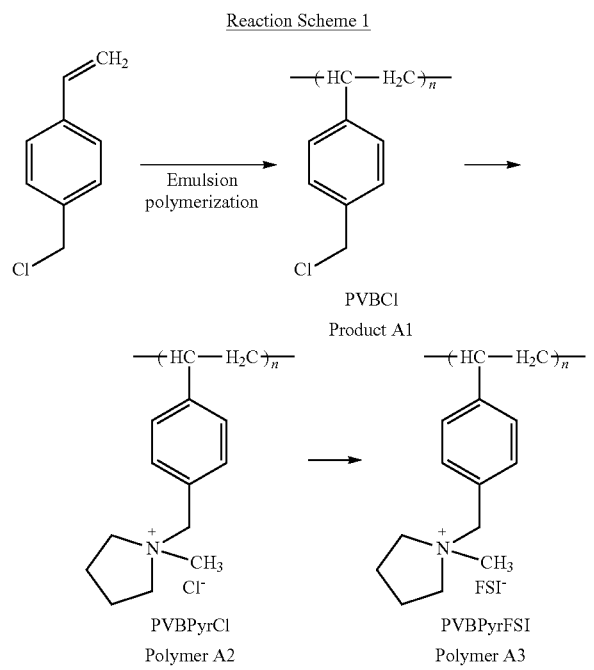

In Reaction Scheme 1, n was controlled to obtain a polymer A3 having a weight average molecular weight of about 300,000 Daltons.

Lithium bis(fluorosulfonyl)imide (LIFSI, available from PANAX) and acetone were added to the polymer A2 to prepare a polymer composition. The amount of the acetone was controlled to be about 10 wt % of the polymer A2. A mixing molar ratio of the polymer A2 to LiTFSl was about 1:1.2. This reaction mixture was stirred at room temperature (25° C.) for about 6 hours to thereby prepare a nanostructure including the polymer A3 in which Cl⁻ anions in the polymer A2 were substituted by TFSI⁻ anions.

Preparation Example 2: Synthesis of Nanostructure

A nanostructure was prepared in the same manner as described in Preparation Example 1, except that the amount of the divinylbenzene used for the emulsion polymerization was changed to 5 parts by weight with respect to 100 parts by weight of a total weight of the 1-chloromethyl-4-vinylbenzene and the divinylbenzene.

Preparation Example 3: Synthesis of Nanostructure

A nanostructure was prepared in the same manner as described in Preparation Example 2, except that 1-ethyl-3-methyl-imidazole was used instead of N-methylpyrrolidine.

Preparation Example 4: Synthesis of Random Copolymer

After 10 g of 1-chloromethyl-4-vinylbenzene (available from Oakwood Chemical) and poly(ethylene glycol)methylether methacrylate (A) were added into a reactor, 0.075 g of azobisisobutyronitrile (AIBN) as a polymerization initiator was added thereto. Then, this mixture was subjected to polymerization reaction with stirring at about 60° C. for about 15 hours. A molar ratio of 1-chloromethyl-4-vinylbenzene to poly(ethylene glycol) methylether methacrylate was about 4:1. After termination of the polymerization reaction, the solvent was removed by evaporation under reduced pressure, and the resultant was precipitated with n-hexane to obtain a random copolymer (B) as a polymerization product.

Reaction Scheme 2

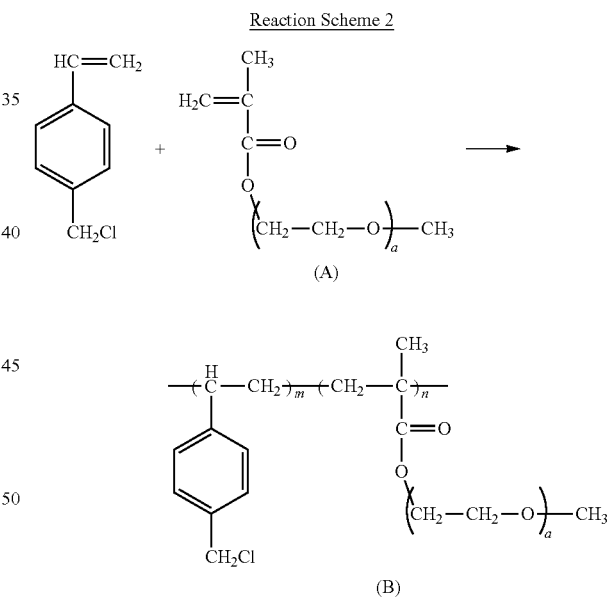

In Reaction Scheme 2, m and n, which indicate mole fractions, are 0.8 and 0.2, respectively, and the sum of m and n is 1; and a is 10. The degree of polymerization was controlled to obtain the random polymer (B) of Formula 10e having a weight average molecular weight of about 300,000 Daltons.

6.13 g of N-methylpyrrolidine (97%, available from Sigma-Aldrich) dissolved in 100 mL of dichloroethane was added to 100 mL of random copolymer (B), and then reacted about 70° C. for about 9 hours to prepare a random copolymer (C).

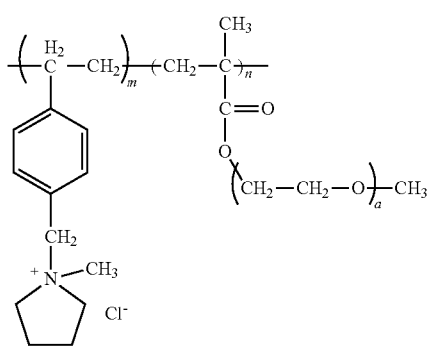

(C)

In the formula of random copolymer (C), m is 0.8, n is 0.2, and a is 10.

Lithium bis(trifluoromethylsulfonyl)imide (LiTFSl, available from PANAX) and acetone were added in a molar ratio of about 1:1.2 to the random copolymer (C) to prepare a random copolymer composition. The amount of acetone was adjusted such that the amount of the random copolymer (C) was about 10 wt % based on a total weight of a random copolymer composition including a random copolymer and acetone. The reaction mixture was stirred at room temperature (25° C.) for 6 hours to synthesize a random copolymer represented by Formula 10e in which a TFSI⁻ anion was substituted for the Cl⁻ anion of the random copolymer.

Formula 10e

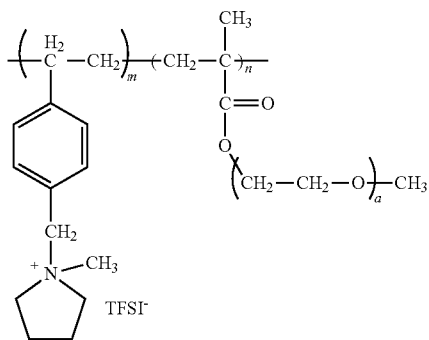

In Formula 10e, m and n, which indicate mole fractions, are 0.8 and 0.2, respectively, and the sum of m and n is 1; and a is 10. The degree of polymerization was controlled to obtain the random copolymer of Formula 10e having a weight average molecular weight of about 300,000 Daltons.

Preparation Example 5: Preparation of Random Copolymer

A random copolymer represented by Formula 10e was prepared in the same manner as in Preparation Example 4, except that, in preparing the random copolymer (B), the molar ratio of 1-chloromethyl-4-vinylbenzene to poly(ethylene glycol) methylether methacrylate was varied to 1:1. In Formula 10e, m and n were both 0.5.

Preparation Example 6: Preparation of Random Copolymer

A random copolymer represented by Formula 10e was prepared in the same manner as in Preparation Example 4, except that, in preparing the random copolymer (B), the molar ratio of 1-chloromethyl-4-vinylbenzene to poly(ethylene glycol) methylether methacrylate was varied to 2:1. In Formula 10e, m and n were 0.67 and 0.23, respectively.

Preparation Example 7: Synthesis of Random Copolymer

A random copolymer represented by Formula 10f was prepared in the same manner as in Preparation Example 4, except that lithium bis(fluorosulfonyl)imide (LiFSI, available from PANAX) was used instead of the lithium bis (trifluoromethylsulfonyl)imide (LiTFSl) added to the random copolymer (C).

Formula 10f

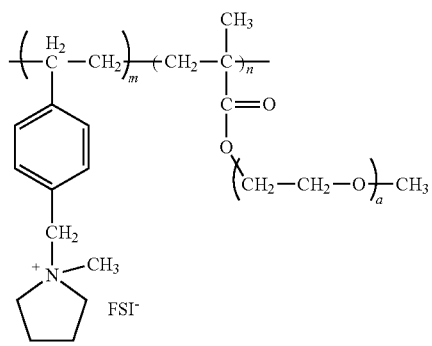

In Formula 10f, m and n, which indicate mole fractions, are 0.8 and 0.2, respectively, and the sum of m and n is 1; and a is 10. The degree of polymerization of the random polymer of Formula 10f was controlled to obtain the random polymer of Formula 1 Of having a weight average molecular weight of about 300,000 Daltons.

Preparation Example 8: Preparation of Random Copolymer

A random copolymer represented by Formula 10g was prepared in the same manner as in Preparation Example 4, except that a compound represented by Formula 11 was used instead of 1-chloromethyl-4-vinylbenzene.

Formula 11

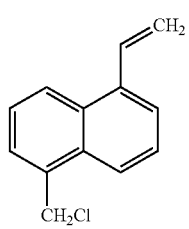

-continued

Formula 10g

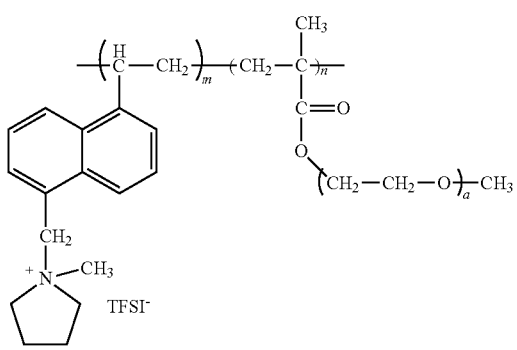

In Formula 10g, m and n are 0.8 and 0.2, respectively, and the sum of m and n is 1; and a is 10. The degree of polymerization of the random polymer of Formula 10g was controlled to obtain the random polymer of Formula 10g having a weight average molecular weight of about 300,000 Daltons.

Example 1: Manufacturing of Composite Membrane and Lithium Battery (Li/Li Symmetric Cell)

0.4 g of the random copolymer of Formula 10e prepared in Preparation Example 4 was dissolved in 4 mL of a mixed solvent (5:5 by volume ratio) of dimethylformamide (DMF) and tetrahydrofuran (THF) to obtain a polymer solution. After 0.2 g of LiTFSI as a lithium salt was added to this polymer solution and dissolved, 0.03 g of the nanostructure of Preparation Example 1 was added thereto to obtain a composition for forming a composite membrane. The content of the nanostructure in the composite membrane formation composition was about 5 parts by weight with respect to 100 parts by weight of the composite membrane formation composition.

The composite membrane formation composition was coated on a lithium foil having a thickness of about 20 μm, dried in a drying room at room temperature (25° C.) for about 2 days, and then vacuum-dried at about 60° C. overnight to thereby form a composite membrane (having a thickness of about 5 μm) on the lithium anode, the composite membrane being free of the solvent and including the random copolymer, the lithium salt, and the nanostructure. A lithium anode was further stacked on a surface of the composite membrane, thereby manufacturing a Li/Li symmetric cell.

Examples 2 and 3: Manufacturing of Composite Membrane and Lithium Battery (Li/Li Symmetric Cell)

Li/Li symmetric cells were manufactured in the same manner as in Example 1, except that the nanostructures prepared in Preparation Examples 2 and 3 were used, respectively, instead of the nanostructure of Preparation Example 1.

Comparative Example 1: Manufacturing of Composite Membrane and Lithium Battery (Li/Li Symmetric Cell)

A composite membrane and a lithium battery were manufactured in the same manner as in Example 1, except that a composite membrane prepared as follows was used instead of the composite membrane used in Example 1.

The composite membrane was obtained by coating a composite membrane formation composition containing 0.4 g of polyethylene oxide, 0.03 g of alumina, 0.2 g of LiTFSI, and 4 mL of acetonitrile as a solvent on a lithium foil having a thickness of about 20 μm with a doctor blade, drying a resulting product in a drying room at room temperature (25° C.) for about 2 days, and then further drying under vacuum at about 60° C. overnight.

Comparative Example 2: Manufacturing of Composite Membrane and Lithium Battery (Li/Li Symmetric Cell)

A composite membrane and a lithium battery were manufactured in the same manner as in Comparative Example 1, except that, in preparing the composite membrane formation composition, 0.03 g of alumina was not added.

Evaluation Example 1: Scanning Electron Microscopy (SEM)

The nanostructure of Preparation Example 1 was analyzed using a scanning electron microscope (JSM-7500F) at an accelerating voltage of about 20 kV. The results of the scanning electron microscopy (SEM) are shown in FIGS. 2A and 2B.

Figure 2A:
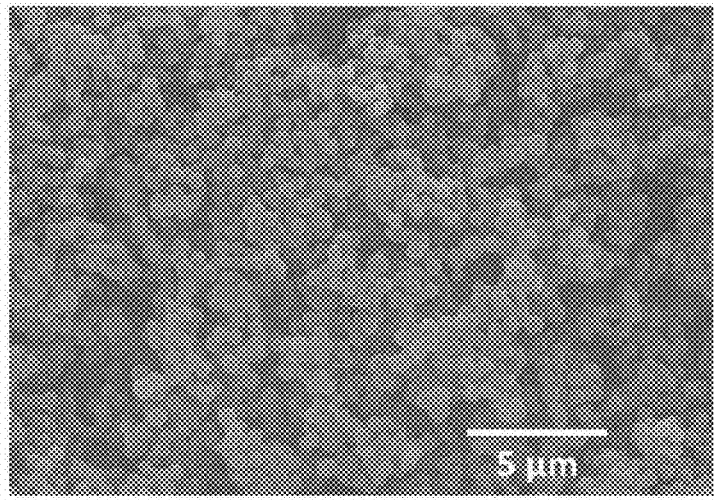
FIGS. 2A and 2B show the results of scanning electron microscopy (SEM) analysis on a nanostructure of Preparation Example 1.
Figure 2B:
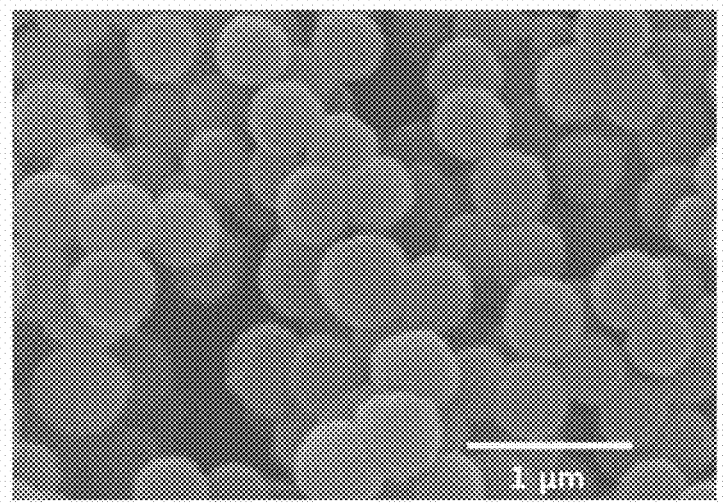

Referring to FIGS. 2A and 2B, the nanostructure obtained according to Preparation Example 1 was found to have a nanosphere shape having a uniform size (average particle diameter) of about 550 nm.

Evaluation Example 2: Measurement of Lithium Ion Transfer Numbers, Lithium Ion Conductivities, and Real Ion Conductivity Lithium ion transfer numbers, lithium ion conductivities, and real ion conductivity at 25° C. of the lithium batteries manufactured in Example 1, Comparative Example 1, and Comparative Example 2 were measured and used to calculate real ion conductivities defined by Equation 1.

$$\text{Real ion conductivity} = \text{Lithium ion conductivity} \times \text{Lithium ion transfer number} \quad \text{Equation 1}$$

The lithium battery of Example 1 was found to have a lithium ion conductivity of about $5.61 \times 10^{-5}$ Siemens per centimeter (S/cm), a lithium ion transfer number of about 0.24, and a real ion conductivity of about $1.35 \times 10^{-5}$ S/cm. The lithium batteries of Comparative Example 1 and Comparative Example 2 were found to have a lithium ion conductivity at 25° C. of about $2.32 \times 10^{-6}$ S/cm and about $4.51 \times 10^{-6}$ S/cm, respectively. These results indicate that the lithium battery of Example 1 had improved lithium ion conductivity and improved real ion conductivity, as compared with the lithium batteries of Comparative Examples 1 and 2.

Evaluation Example 3: Charge and Discharge Characteristics

Figure 3:
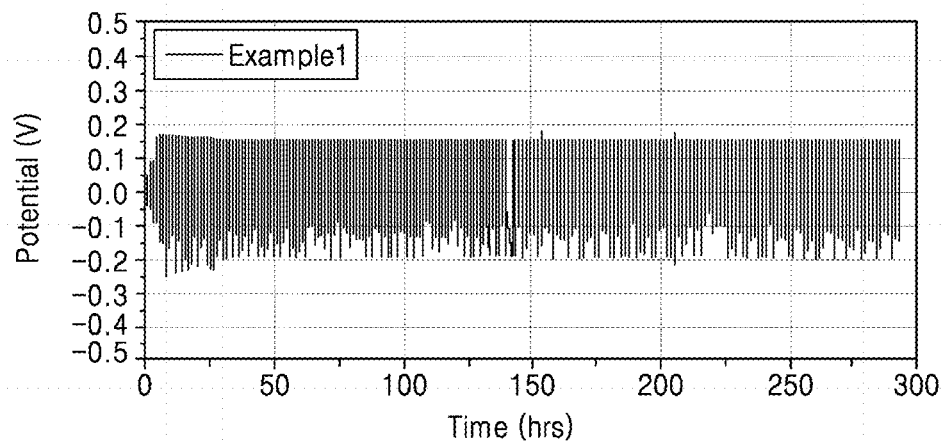
FIG. 3 and is a graph of potential (volts, V) versus time (hours, hrs) illustrating the results of electrochemical stability measurement of a lithium battery manufactured in accordance with Example 1.
Figure 4:
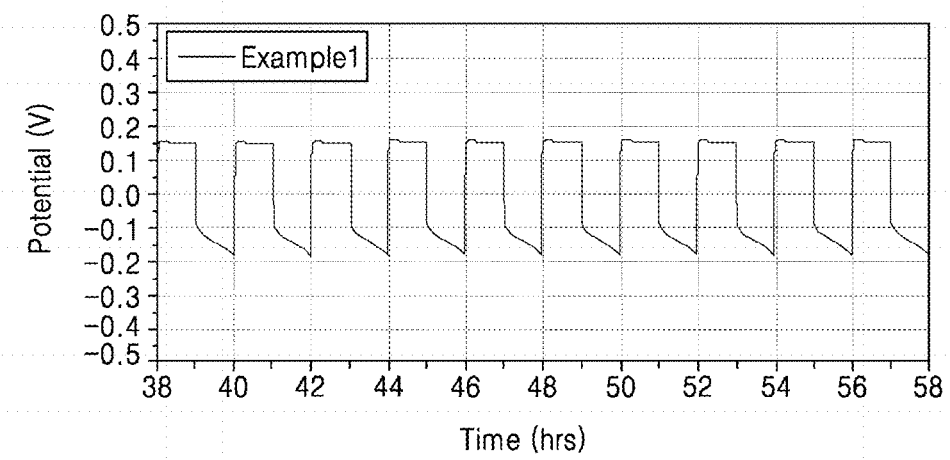
FIG. 4 is an expanded view of a portion of the graph in FIG. 3.

A Li ion deposition/dissolution behavior of the lithium battery (Li/Li symmetric cell) of Example 1 was evaluated through charging and discharging at a rate of about 0.2 mA/cm² for about 1 hour, and an electrochemical stability of the lithium battery was measured over time. The results of the electrochemical stability measurement are shown in FIGS. 3 and 4. FIG. 4 is an expanded view of a portion of the graph in FIG. 3. A deposition/stripping efficiency was also evaluated.

Due to an increased lithium ion conductivity and a reduced interfacial resistance with use of the composite membrane of Example 1, the Li/Li symmetric cell using the composite membrane of Example 1 maintained a relatively low over-potential and exhibited a stable deposition/dissolution behavior during the charge/discharge cycle, indicating improved cycle characteristics.

When the composite membrane of Example 1 was used, a deposition/stripping efficiency of the lithium battery was about 92%.

Evaluation Example 4: X-Ray Photoelectron Spectroscopy (XPSj

Figure 5A:
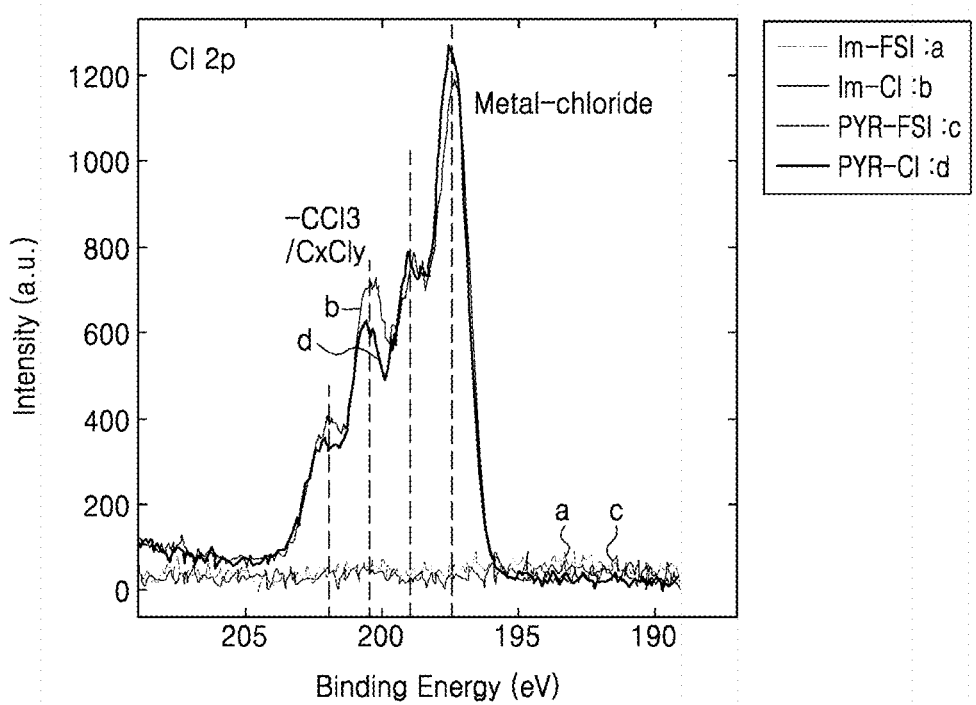
FIGS. 5A, 5B, and 5C are graphs of intensity (arbitrary units, a.u.) versus binding energy (electron volts, eV), and which show the results of X-ray photoelectron spectroscopy (XPS) analysis performed on the nanostructures prepared in accordance with Preparation Example 1 and Preparation Example 3.
Figure 5B:
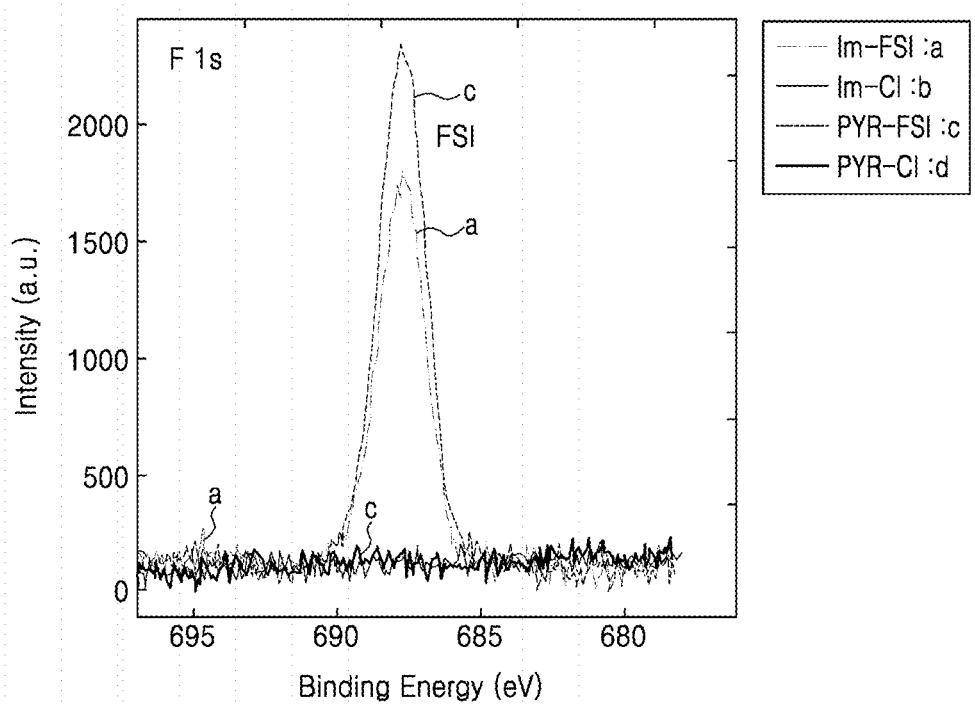
Figure 5C:
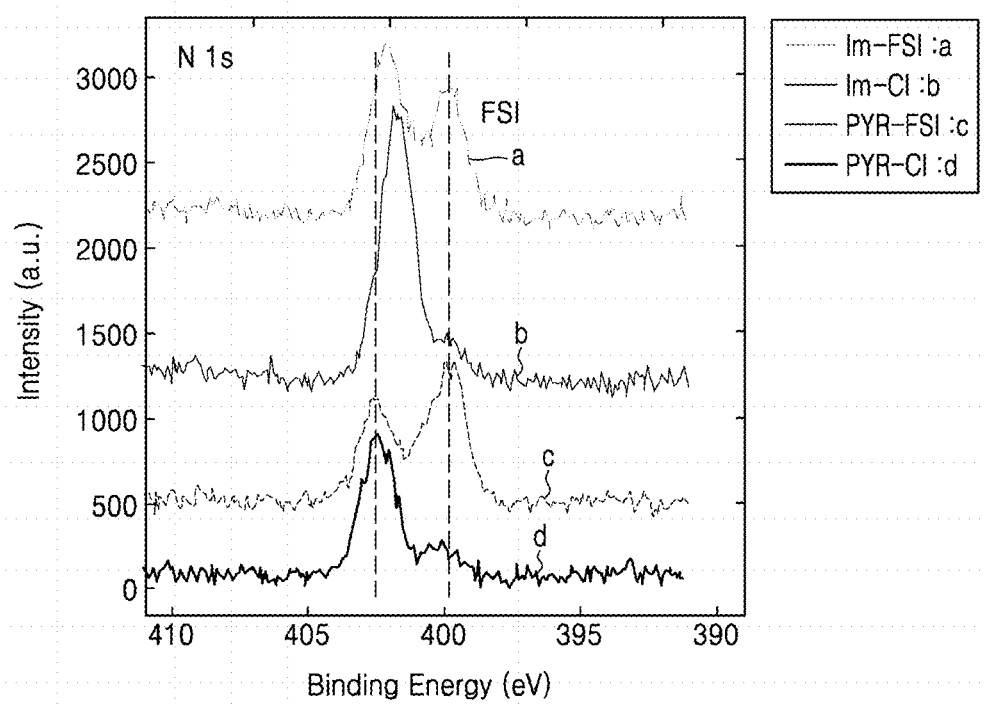

The nanostructures obtained in Preparation Example 1 and Preparation Example 3 were analyzed by X-ray photoelectron spectroscopy (XPS) using a Quantera II XPS Scanning Microprobe (available from ULVAC-PHI, Inc.). The analysis results are shown in FIGS. 5A to 5C. In FIGS. 5A to 5C, PYR-CI and PYR-FSI denote polymer A2 and polymer A3 of Preparation Example 1, respectively, and Im-CI and Im-FSI denote polymer A2 and polymer A3 of Preparation Example 3, respectively.

From the results of FIGS. 5A and 5C, a synthesis of the nanostructures of Preparation Examples 1 and 3 may be understood and the synthesis of nanostructures of Preparation Examples 1 and 3 was confirmed.

Evaluation Example 5: MALDI-TOF Mass Spectrometry

The nanostructure obtained according to Preparation Example 1 was analyzed by matrix-assisted laser desorption/ionization time-of-flight (MALDI-TOF) mass spectrometry using a MALDI-TOF mass spectrometer (Ultraflex II, Bruker). The results of the MALDI-TOF mass spectrometry are shown in FIG. 6.

Figure 6:
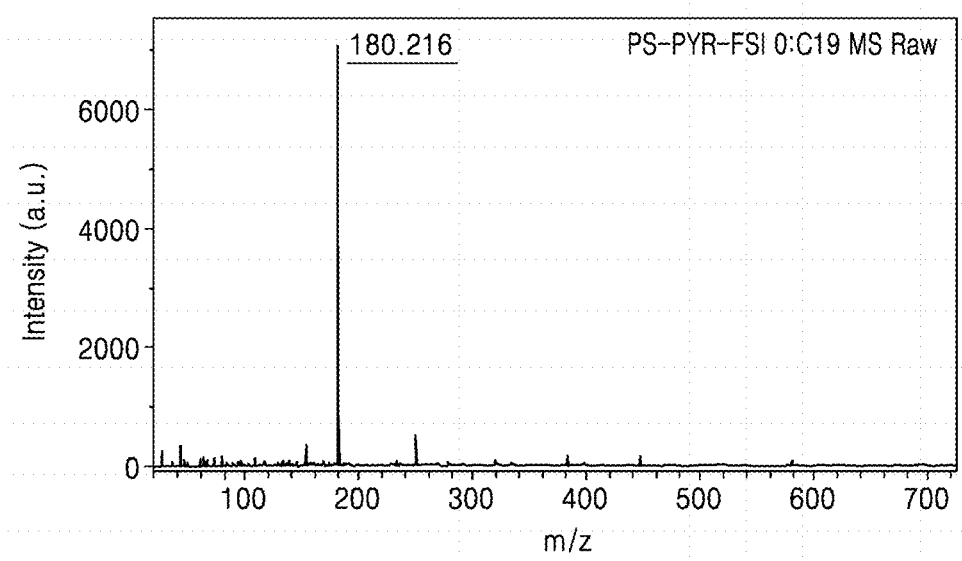
FIG. 6 is a graph of intensity (a.u.) versus mass to charge ratio (m/z), which shows the results of the matrix-assisted laser desorption/ionization time-of-flight (MALDI-TOF) mass spectrometry analysis performed on the nanostructure prepared in Preparation Example 1.

Referring to FIG. 6, it was possible to identify an anion structure of the nanostructure obtained in Preparation Example 1.

As described above, according to the one or more embodiments, a secondary battery having improved electrochemical performance may be obtained by using a composite membrane having improved real ion conductivity.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite membrane for a secondary battery, the composite membrane comprising:
a nanostructure comprising a cross-linked polymer comprising a repeating unit represented by Formula 1 and a unit derived from a crosslinking compound:

Formula 1 wherein, in Formula 1, $Ar_1$ is a substituted or unsubstituted C6-C30 arylene group or a substituted or unsubstituted C3-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

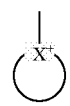

is a 3-membered to 31-membered ring including 2 to 30 carbon atoms,

X is S, N, N(R), or P(R'),

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group, and $Y^-$ is an anion.

2. The composite membrane of claim 1, wherein the cross-linked polymer is a reaction product of a compound represented by Formula 3, a polymerization product, and then a compound comprising the anion $Y^-$, wherein the polymerization product is a polymerization product of a monomer represented by Formula 2 and the crosslinking compound:

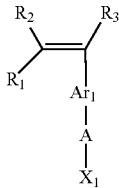

Formula 2 wherein, in Formula 2,
$Ar_1$ is a substituted or unsubstituted C6-C30 arylene group, or a substituted or unsubstituted C3-C30 heteroarylene group,
$R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group,
A is a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,
$X_1$ is a halogen atom,

Formula 3 wherein, in Formula 3,

is a 3-membered to 31-membered ring including 2 to 30 carbon atoms,
X is S, N, N(R), or P(R'),
R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group.

3. The composite membrane of claim 1, wherein the nanostructure comprises the cross-linked polymer.

4. The composite membrane of claim 1, wherein the nanostructure comprises a polymeric nanostructure coated with the cross-linked polymer on a surface thereof.

5. The composite membrane of claim 1, wherein the crosslinking compound comprises 1,2-divinylbenzene, 1,3-divinylbenzene, 1,4-divinylbenzene 1,2,4-trivinylbenzene, 1,3-divinylnaphthalene, 1,8-divinylnaphthalene, 1,3,5-trivinylnaphthalene, 2,4-divinylbiphenyl, 4,4'-divinylbiphenyl, 3,5,7-trivinylnaphthalene, 1,2-divinyl-3,4-dimethylbenzene, 1,5,6-trivinyl-3,7-diethylnaphthalene, 1,3-divinyl-4,5,8-tributylnaphthalene, 2,2'-divinyl-4-ethyl-4'-propylbiphenyl, or a combination thereof.

6. The composite membrane of claim 1, wherein, the crosslinking compound is $CH_2=CH-Ar_2-CH=CH_2$, wherein $Ar_2$ is a substituted or unsubstituted C6-C30 arylene group or a substituted or unsubstituted C3-C30 heteroarylene group, and the cross-linked polymer is a polymer represented by Formula 4:

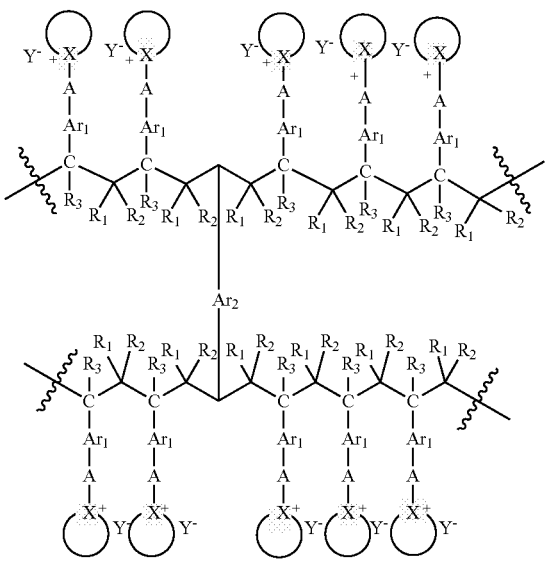

Formula 4 wherein, in Formula 4, $Ar_1$, A, $R_1$ to $R_3$,

X, and Y are the same as defined for Formula 1.

7. The composite membrane of claim 1, wherein the nanostructure comprises a nanosphere and has a size of about 1 nanometer to about 10 micrometer.

8. The composite membrane of claim 1, wherein a content of the nanostructure is about 0.5 parts to about 90 parts by weight with respect to 100 parts by weight of the composite membrane.

9. The composite membrane of claim 1, wherein, in Formula 1, $Ar_1$ is a phenylene group, a biphenylene group, a naphthalenylene group, a phenanthrenylene group, a triphenylenylene group, an anthracenylene group, a fluorenylene group, or a carbazolylene group.

10. The composite membrane of claim 1, wherein, in Formula 1, $Ar_1$ is a group represented by Formula 5-1, Formula 5-2, Formula 5-3, Formula 5-4, or Formula 5-5:

Formula 5-1
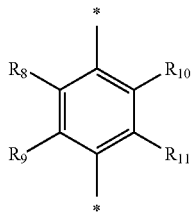

Formula 5-2
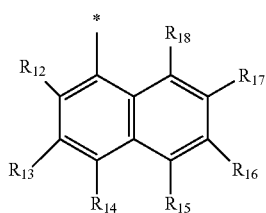

Formula 5-3
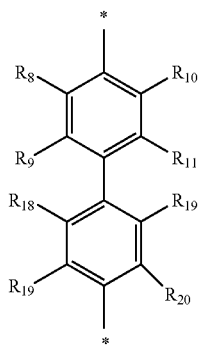

Formula 5-4
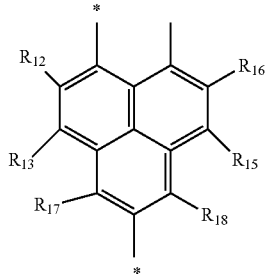

Formula 5-5
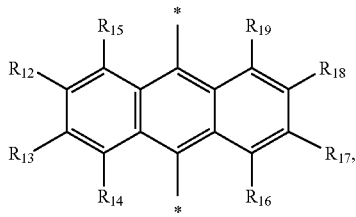

wherein, in Formula 5-1, Formula 5-2, Formula 5-3, Formula 5-4, and Formula 5-5, * indicates a binding site, and $R_8$ to $R_{20}$ are each independently hydrogen, an unsubstituted or substituted C1-C20 alkyl group, an unsubstituted or substituted C6-C20 aryl group, or an unsubstituted or substituted C3-C30 heteroaryl group.

11. The composite membrane of claim 1, wherein, in Formula 1,

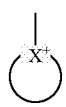

is a group represented by Formula 6-1, Formula 6-2, Formula 6-3, Formula 6-4, or Formula 6a:

Formula 6-1
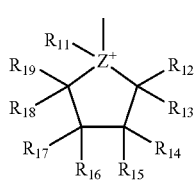

Formula 6-2
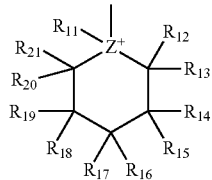

Formula 6-3
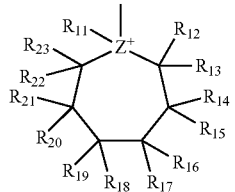

Formula 6-4
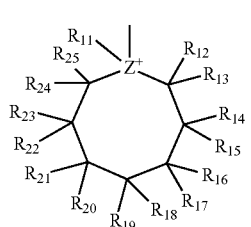

wherein, in Formula 6-1, Formula 6-2, Formula 6-3, and Formula 6-4, Z is S, N, or P;

$R_{11}$ to $R_{25}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group; and $R_{11}$ is absent when Z is S, and Formula 6a

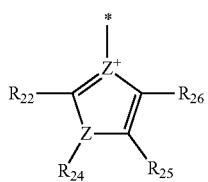

wherein, in Formula 6a, $R_{22}$ and $R_{24}$ to $R_{26}$ are defined the same as $R_{11}$ to $R_{25}$ of Formula 6-1, Formula 6-2, Formula 6-3, and Formula 6-4; and Z is N.

12. The composite membrane of claim 1, wherein

in Formula 1 is a group represented by Formula 7-1 or Formula 7-2, and $Y^-$ of Formula 1 comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof:

Formula 7-1

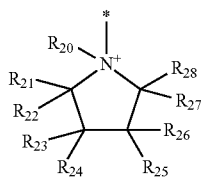

Formula 7-2

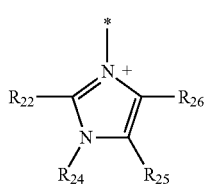

wherein, in Formula 7-1 and Formula 7-2, $R_{20}$ to $R_{28}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

13. The composite membrane of claim 1, wherein, in the nanostructure of the cross-linked polymer, the cross-linked polymer comprises a repeating unit represented by Formula 8-1, Formula 8-2, Formula 8-3, Formula 8-4, or a combination thereof, and a crosslinking unit derived from divinylbenzene:

Formula 8-1

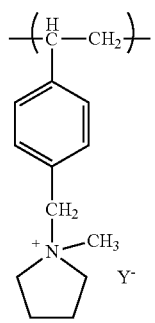

Formula 8-2

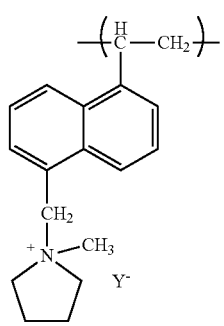

Formula 8-3

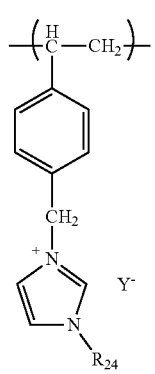

Formula 8-4

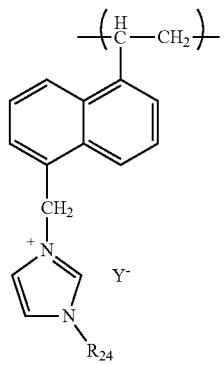

wherein, in Formula 8-1, Formula 8-2, Formula 8-3, and Formula 8-4, $R_{24}$ is hydrogen, a C1-C30 alkyl group, a C1-C30 alkoxy group, C6-C30 aryl group, C6-C30 aryloxy group, a C3-C30 heteroaryl group, a C3-C30 heteroaryloxy group, a C4-C30 cycloalkyl group, or a C4-C30 heterocycloalkyl group, Y⁻ comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, or $(O(CF_3)_2C_2(CF_3)_2O)_2PO^-$, or a combination thereof.

14. The composite membrane of claim 1, wherein the composite membrane further comprises a metal salt comprising lithium, sodium, potassium, magnesium, zinc, silver, aluminum, or a combination thereof, and an amount of the metal salt is about 1 part by weight to about 90 parts by weight with respect to 100 parts by weight of the composite membrane.

15. The composite membrane of claim 1, wherein the composite membrane further comprises an ion-conductive polymer.

16. The composite membrane of claim 15, wherein the ion-conductive polymer comprises a polymer comprising a repeating unit represented by Formula 1a,
a first copolymer comprising a first repeating unit presented by Formula 1a and a second repeating unit represented by Formula 9, or a second copolymer comprising a first repeating unit represented by Formula 1a and a second repeating unit represented by Formula 9a, or
a combination of at least two of the polymer, the first copolymer, or the second copolymers:

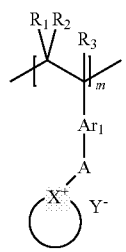

Formula 1a wherein, in Formula 1a, $Ar_1$ is a substituted or unsubstituted C6-C30 arylene group or a substituted or unsubstituted C3-C30 heteroarylene group, $R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group, A is a chemical bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group,

is a 3-membered to 31-membered ring including 2 to 30 carbon atoms,

X is S, N, N(R), or P(R'),

R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group, and Y⁻ is an anion,

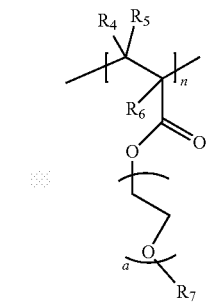

Formula 9 wherein, in Formula 9, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, $R_7$ is hydrogen, an unsubstituted or substituted C1-C20 alkyl group, or an unsubstituted or substituted C6-C20 aryl group, a is an integer from 1 to 10, and in the polymer, m is a degree of polymerization and is about 10 to about 5000, in the first copolymer, m and n, which represent molar fractions of the repeating units represented by Formula 1a and Formula 9 or 9a, respectively, are each independently greater than 0 and less than 1, and the sum of m and n is 1,

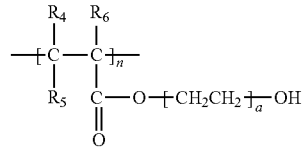

Formula 9a wherein, in Formula 9a, $R_4$, $R_5$, and $R_6$ are each independently hydrogen, an unsubstituted or substituted C1-C20 alkyl group, an unsubstituted or substituted C6-C20 aryl group, or an unsubstituted or substituted C3-C30 heteroaryl group, a is an integer from 1 to 10, and in the second copolymer, m and n, which represent molar fractions of the repeating units represented by Formula 1 and Formula 9a, respectively, are each independently greater than 0 and less than 1, and the sum of m and n is 1.

17. The composite membrane of claim 16, wherein, in Formula 1a, $Ar_1$ is a group represented by Formula 5-1, Formula 5-2, Formula 5-3, Formula 5-4, or Formula 5-5:

Formula 5-1
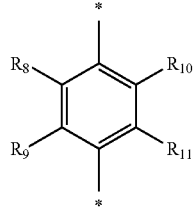

Formula 5-2
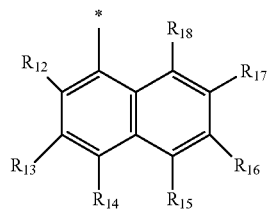

Formula 5-3
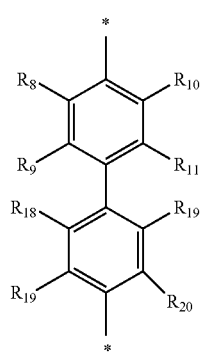

Formula 5-4
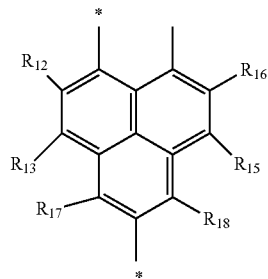

Formula 5-5
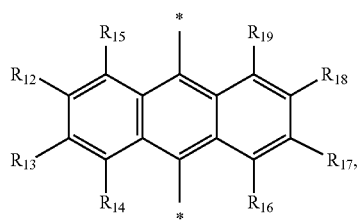

wherein, in Formula 5-1, Formula 5-2, Formula 5-3, Formula 5-4, and Formula 5-5, * indicates a binding site, and $R_8$ to $R_{20}$ are each independently hydrogen, an unsubstituted or substituted C1-C20 alkyl group, an unsubstituted or substituted C6-C20 aryl group, or an unsubstituted or substituted C3-C30 heteroaryl group.

18. The composite membrane of claim 16, wherein

in Formula 1a is a group represented by Formula 6-1, Formula 6-2, Formula 6-3, Formula 6-4, or Formula 6a:

Formula 6-1
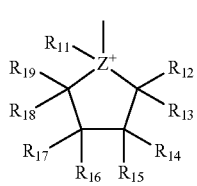

Formula 6-2
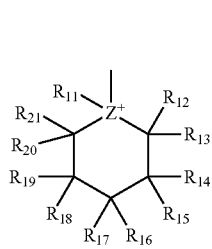

Formula 6-3
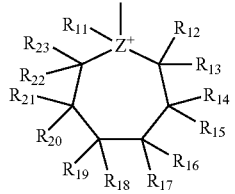

Formula 6-4
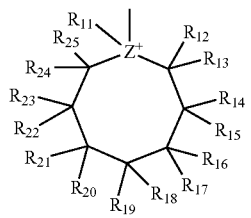

wherein, in Formula 6-1, Formula 6-2, Formula 6-3, and Formula 6-4,

Z is S, N, or P, $R_{11}$ to $R_{25}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, and $R_{11}$ is absent when Z is S, and Formula 6a

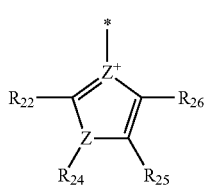

wherein, in Formula 6a, $R_{22}$ to $R_{26}$ are defined the same as $R_{11}$ to $R_{25}$ in Formula 6-1, Formula 6-2, Formula 6-3, and Formula 6-4; and Z is N.

19. The composite membrane of claim 16, wherein

in Formula 1a is a group represented by Formula 7-1 or Formula 7-2, and $Y^-$ of Formula 1a comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof:

Formula 7-1

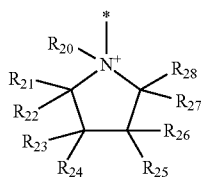

Formula 7-2

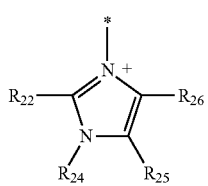

wherein, in Formula 7-1 and Formula 7-2, $R_{20}$ to $R_{28}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group.

20. The composite membrane of claim 16, wherein each of the first copolymer and the second copolymer is a random copolymer.

21. The composite membrane of claim 16, wherein the first copolymer is represented by Formula 10 and has a degree of polymerization of about 10 to about 5,000:

Formula 10

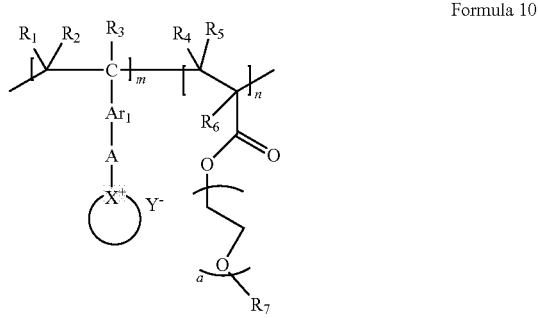

wherein, in Formula 10, $Ar_1$ is a substituted or unsubstituted C6-C30 arylene group;

$R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group;

$R_4$, $R_5$, and $R_6$ may each independently be hydrogen, an unsubstituted or substituted C1-C20 alkyl group, an unsubstituted or substituted C6-C20 aryl group, or an unsubstituted or substituted C3-C30 heteroaryl group;

$R_7$ may each independently be hydrogen, an unsubstituted or substituted C1-C20 alkyl group, or an unsubstituted or substituted C6-C20 aryl group;

A is a chemical bond, or is an unsubstituted or substituted C1-C30 alkylene group, or an unsubstituted or substituted C6-C30 arylene group;

is a group represented by Formula 7-1 or Formula 7-2,

Formula 7-1

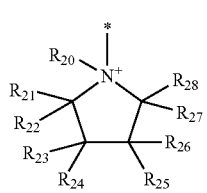

-continued

Formula 7-2

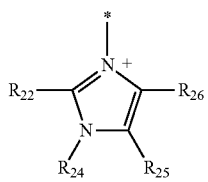

wherein, in Formula 7-1 and Formula 7-2, $R_{20}$ to $R_{28}$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, and * indicates a binding site;

$Y^-$ comprises $BF_4^-$, $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof, and m and n are each independently 0.01 to 0.99, and the sum of m and n is 1.

22. The composite membrane of claim 16, wherein the first copolymer comprises a compound represented by Formula 10a, Formula 10b, Formula 10c, Formula 10d, or a combination thereof:

Formula 10a

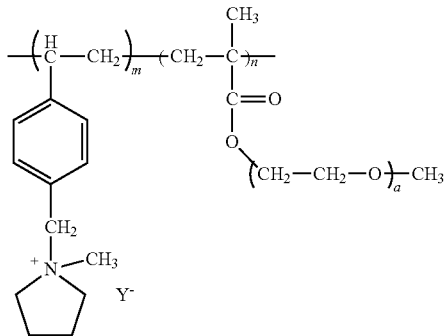

Formula 10b

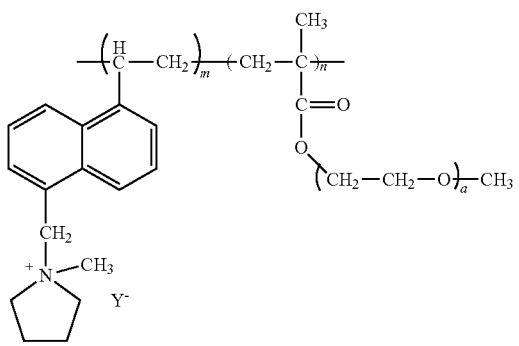

Formula 10c

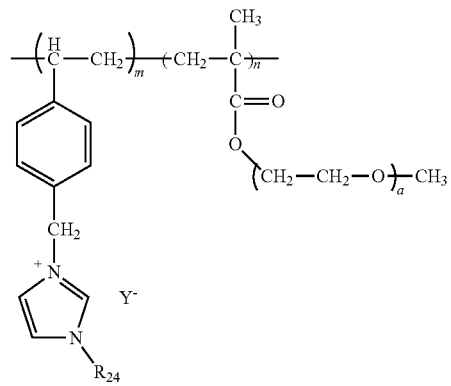

Formula 10d

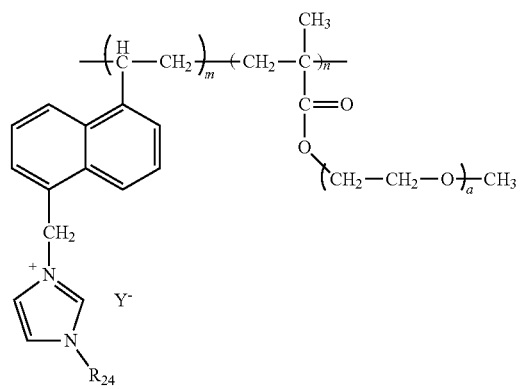

wherein, in Formula 10a, Formula 10b, Formula 10c, and Formula 10d, $Y^-$ comprises $PF_6^-$, $AsF_6^-$, $SbF_6^-$, $AlCl_4^-$, $HSO_4^-$, $CH_3SO_3^-$, $(CF_3SO_2)_2N^-$, $Cl^-$, $Br^-$, $I^-$, $SO_4^{2-}$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof;

a is an integer from 1 to 10;

$R_{24}$ is a C1-C10 alkyl group;

m and n are each independently 0.01 to 0.99, and the sum of m and n is 1; and a degree of polymerization is about 10 to about 5000.

23. The composite membrane of claim 1, wherein the composite membrane has a thickness of about 1 nm to about 1000 μm.

24. A secondary battery comprising a cathode, an anode, and the composite membrane of claim 1 disposed between the cathode and the anode.

25. The secondary battery of claim 24, wherein the anode comprises a lithium metal or a lithium metal alloy.

26. The secondary battery of claim 24, wherein the anode comprises an anode active material comprising a carbonaceous material, silicon, a silicon oxide, a silicon alloy, a silicon-carbonaceous material composite, tin, a tin alloy, a tin-carbon composite, lithium metal, a metal alloyable with lithium, an alloy thereof, or an oxide thereof, a metalloid alloyable with lithium, an alloy thereof, or an oxide thereof, or a combination thereof.

27. The secondary battery of claim 23, wherein the secondary battery further comprises a liquid electrolyte, a solid electrolyte, a gel electrolyte, a polymer ionic liquid, or a combination thereof.

28. The secondary battery of claim 23, wherein the secondary battery is a lithium secondary battery.

29. A method of preparing the composite membrane for a secondary battery of claim 1, the method comprising:
polymerizing a monomer represented by Formula 2 and a crosslinking compound to provide a polymerization product,
reacting the polymerization product with a compound represented by Formula 3 to provide a reaction product, and
reacting the reaction product with a compound comprising an anion to obtain the nanostructure comprising the cross-linked polymer; and
preparing a composite membrane formation composition comprising the nanostructure; and
coating and drying the composite membrane formation composition, thereby preparing the composite membrane of claim 1,

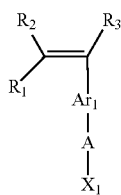

Formula 2 wherein, in Formula 2, $Ar_1$ is a substituted or unsubstituted C6-C30 arylene group, or a substituted or unsubstituted C3-C30 heteroarylene group;
$R_1$, $R_2$, and $R_3$ are each independently hydrogen, an unsubstituted or substituted C1-C20 alkyl group, an unsubstituted or substituted C6-C20 aryl group, or an unsubstituted or substituted C3-C30 heteroaryl group;
A is a bond, an unsubstituted or substituted C1-C30 alkylene group, an unsubstituted or substituted C6-C30 arylene group, an unsubstituted or substituted C3-C30 heteroarylene group, an unsubstituted or substituted C4-C30 cycloalkylene group, or an unsubstituted or substituted C3-C30 heterocycloalkylene group; and
$X_1$ is a halogen atom, and

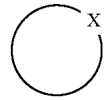

Formula 3 wherein, in Formula 3,

is a 3-membered to 31-membered ring including 2 to 30 carbon atoms,
X is S, N, N(R), or P(R'), and
R and R' are each independently hydrogen, an unsubstituted or substituted C1-C30 alkyl group, an unsubstituted or substituted C1-C30 heteroalkyl group, an unsubstituted or substituted C1-C30 alkoxy group, an unsubstituted or substituted C6-C30 aryl group, an unsubstituted or substituted C7-C30 arylalkyl group, an unsubstituted or substituted C6-C30 aryloxy group, an unsubstituted or substituted C3-C30 heteroaryl group, an unsubstituted or substituted C4-C30 heteroarylalkyl group, an unsubstituted or substituted C3-C30 cycloalkyl group, an unsubstituted or substituted C2-C30 alkenyl group, or an unsubstituted or substituted C3-C30 alkynyl group.

30. The method of claim 29, wherein the composite membrane formation composition further comprises: an ion-conductive polymer; a metal salt comprising lithium, sodium, potassium, magnesium, zinc, silver, aluminum, or a combination thereof; and a solvent.

31. The secondary battery of claim 25, wherein the anode is a lithium metal electrode or a lithium metal alloy electrode, and the composite membrane is an anode protective layer, an electrolyte, or both an anode protective layer and an electrolyte.

* * * * *